(12) United States Patent
Chyou

(10) Patent No.: US 9,697,323 B2
(45) Date of Patent: Jul. 4, 2017

(54) ACCELERATED AND ACCURACY-ENHANCED DELAY AND NOISE INJECTION CALCULATION FOR ANALYSIS OF A DIGITAL CIRCUIT USING GRID COMPUTING

(71) Applicant: Shang-Woo Chyou, Oak Park, CA (US)

(72) Inventor: Shang-Woo Chyou, Oak Park, CA (US)

(73) Assignee: Chyou and Hsu Family Trust 2013, Oak Park, CA (US)

( * ) Notice: Subject to any disclaimer, the term of this patent is extended or adjusted under 35 U.S.C. 154(b) by 43 days.

(21) Appl. No.: 14/811,663

(22) Filed: Jul. 28, 2015

(65) Prior Publication Data

US 2016/0025809 A1    Jan. 28, 2016

Related U.S. Application Data

(60) Provisional application No. 62/030,006, filed on Jul. 28, 2014, provisional application No. 62/051,225, filed on Sep. 16, 2014.

(51) Int. Cl.
*G06F 17/50*    (2006.01)

(52) U.S. Cl.
CPC ...... *G06F 17/5081* (2013.01); *G06F 2217/78* (2013.01); *G06F 2217/82* (2013.01)

(58) Field of Classification Search
CPC .................................................. G06F 17/50
USPC ........................................................ 716/115
See application file for complete search history.

(56) References Cited

U.S. PATENT DOCUMENTS

2008/0170137 A1* 7/2008 Matsumoto ............ H04N 5/347
                                                                    348/241

* cited by examiner

*Primary Examiner* — Thuan Do
(74) *Attorney, Agent, or Firm* — Morgan, Lewis & Bockius LLP

(57) ABSTRACT

A computer system with one or more processors and memory performs a breadth-first-search for an analysis of a digital circuit that includes a plurality of components. The computer system identifies two or more N generation components, initiates processing of the two or more N generation components, and subsequent to initiating the processing of the two or more N generation components, receives results of processing a subset, less than all, of the two or more N generation components. Prior to receiving results of processing all of the N generation components, the computer system identifies one or more N+1 generation components, and initiates processing of the one or more identified N+1 generation components. Subsequently, the computer system receives results of processing at least a subset of the one or more identified N+1 generation components.

17 Claims, 18 Drawing Sheets

704 Initiate processing of the two or more N generation components

> 716 Processing a respective component of the plurality of components of the digital circuit includes calculating a timing delay associated with a switching activity of an input of the respective component of the plurality of component > 718 Processing a respective component of the plurality of components of the digital circuit includes determining a noise injection associated with a switching activity of an input of the respective component of the plurality of components > 720 Processing a respective component of the plurality of components of the digital circuit includes calculating power consumption associated with a switching activity of an input of the respective component of the plurality of components > 722 Initiating processing of the two or more N generation components includes initiating processing of a predetermined number of on-chip variations for each of the two or more N generation components > 724 (See Figure 7C)

Figure 7B

704 Initiate processing of the two or more N generation components

724 Initiating processing of the two or more N generation components includes sending to a second computer system that is distinct from the computer system instructions for processing the two or more N generation components

726 The second computer system is located remotely from the computer system

728 The second computer system is configured to send instructions to a plurality of distributed computers. A number of the plurality of distributed computers is determined based at least in part on a number of components in the N generation components and a predetermined number of on-chip variations and/or a number of process corners.

730 The second computer system is configured to send to a respective distributed computer of the plurality of distributed computers instructions to process a respective N generation component of the two or more N generation components for a respective on-chip variation and/or a number of process corners

732 Initiating processing of the two or more N generation components includes initiating processing of multiple state transitions for each of the two or more N generation components

734 The second computer system is configured to send instructions to a plurality of distributed computers. A number of the plurality of distributed computers is determined at least based on a number of components in the two or more N generation components and a number of states in the multiple state transitions.

Figure 7C

708 Identifying one or more N+1 generation components of the plurality of components of the digital circuit 736 Identifying the one or more N+1 generation components of the plurality of components of the digital circuit includes identifying the one or more N+1 generation components of the plurality of components of the digital circuit based at least in part on the results of processing the subset of the two or more N generation components

Figure 7D

712 Subsequent to initiating processing of the one or more identified N+1 generation components, receive results of processing at least a subset of the one or more identified N+1 generation components 738 Subsequent to initiating processing of the one or more identified N+1 generation components, receive results of processing the two or more N generation components other than the subset, less than all, of the two or more N generation components; identify additional components of the plurality of components of the digital circuit as additional N+1 generation components; initiate processing of the additional N+1 generation components; and, subsequent to initiating of processing the additional N+1 generation components, receive results of processing at least a subset of the additional N+1 generation components 740 Processing of the additional N+1 generation components is initiated subsequent to receiving results of processing all of the two or more N generation components 742 Identifying the additional components of the plurality of components of the digital circuit as the additional N+1 generation components includes identifying the additional components of the plurality of components of the digital circuit as the additional N+1 generation components based at least in part on the results of processing the two or more N generation components other than the subset, less than all, of the two or more N generation components 744 The results of processing at least the subset of the one or more identified N+1 generation components are received prior to receiving results of processing all of the two or more N generation components 746 The one or more identified N+1 generation components include two or more N+1 generation components

Figure 7E

… (1) ACCELERATED AND ACCURACY-ENHANCED DELAY AND NOISE INJECTION CALCULATION FOR ANALYSIS OF A DIGITAL CIRCUIT USING GRID COMPUTING

RELATED APPLICATIONS

This application claims the benefit of, and priority to, U.S. Provisional Patent Application Ser. No. 62/030,006 filed Jul. 28, 2014 and U.S. Provisional Patent Application Ser. No. 62/051,225 filed Sep. 16, 2014. Both of these applications are incorporated by reference herein in their entirety.

TECHNICAL FIELD

This application relates generally to analysis of digital circuits, and in particular, to computer systems and methods for delay and noise injection calculation for analysis of digital circuits.

BACKGROUND

Semiconductor industry has made significant efforts in reducing feature sizes in digital circuits. As observed by Gordon Moore, transistor densities in high-density integrated circuits have doubled at a fairly steady rate (and this observation is often called "Moore's law"). For example, integrated circuits made in mid-1990s have feature sizes of approximately 350 nm, whereas integrated circuits made in 2014 have feature sizes approaching 14 nm. Such reduction of feature sizes has allowed cost reduction, as more chips can be made using a single die of a silicon wafer.

However, reducing feature sizes has introduced additional challenges. For example, the proximity between two adjacent wires has led to increased noise injection such as cross-talks. In addition, increased resistance and capacitance in wires have deteriorated delays in digital circuits.

Conventional methods for calculating delays, noise injections, and power consumptions on a single computer with a handful of processors are slow and inefficient for use with complex circuits, such as an application specific integrated circuit (ASIC) that includes multi-million logical gates.

SUMMARY

Accordingly, there is a need for more efficient methods and systems for calculating delays, noise injections and power consumptions for complex circuits. Such methods and systems optionally complement or replace conventional methods for calculating delays, noise injections and power consumptions.

In accordance with some embodiments, a method is performed at a computer system with one or more processors and memory. The method includes performing a breadth-first-search for an analysis of a digital circuit that includes a plurality of components, including identifying two or more N generation components of the plurality of components of the digital circuit; initiating processing of the two or more N generation components; and subsequent to initiating the processing of the two or more N generation components, receiving results of processing a subset, less than all, of the two or more N generation components. The method also includes, prior to receiving results of processing all components of the N generation components: identifying one or more N+1 generation components of the plurality of components of the digital circuit; and initiating processing of the one or more identified N+1 generation components. The method further includes subsequent to initiating processing of the one or more identified N+1 generation components, receiving results of processing at least a subset of the one or more identified N+1 generation components.

In accordance with some embodiments, a computer system includes one or more processors and memory storing one or more programs for execution by the one or more processors. The one or more programs include instructions for performing a breadth-first-search for an analysis of a digital circuit that includes a plurality of components, including identifying two or more N generation components of the plurality of components of the digital circuit; initiating processing of the two or more N generation components; subsequent to initiating processing of the two or more N generation components, receiving results of processing a subset, less than all, of the two or more N generation components. The one or more programs also include instructions for, prior to receiving results of processing all components of the N generation components: identifying one or more N+1 generation components of the plurality of components of the digital circuit; and initiating processing of the one or more identified N+1 generation components. The one or more programs further include instructions for, subsequent to sending to the second computer system the instructions for processing the one or more identified N+1 generation components, receiving results of processing at least a subset of the one or more identified N+1 generation components.

In accordance with some embodiments, a non-transitory computer readable storage medium stores one or more programs for execution by one or more processors of a computer system. The one or more programs include instructions for performing a breadth-first-search for an analysis of a digital circuit that includes a plurality of components, including identifying two or more N generation components of the plurality of components of the digital circuit; initiating processing of the two or more N generation components; and, subsequent to initiating processing of the two or more N generation components, receiving results of processing a subset, less than all, of the two or more N generation components. The one or more programs also include instructions for, prior to receiving results of processing all components of the N generation components: identifying one or more N+1 generation components of the plurality of components of the digital circuit; and initiating processing of the one or more identified N+1 generation components. The one or more programs further include instructions for, subsequent to sending to the second computer system the instructions for processing the one or more identified N+1 generation components, receiving results of processing at least a subset of the one or more identified N+1 generation components.

In accordance with some embodiments, a method is performed at a computer system with one or more processors and memory, the computer system coupled with a plurality of node computers. The method includes identifying a plurality of simulations to be performed for various connections in a circuit; identifying multiple groups of simulations from the plurality of simulations, each group including simulations that correspond to a same connection in the circuit; sending simulation information for separate groups to subsets of the plurality of node computers, including sending simulation information for a first group to a first subset of the plurality of node computers and sending simulation information for a second group to a second subset of the plurality of node computers; receiving simulation results for the separate groups from the subsets of the plurality of node computers; compiling the simulation results for the separate groups; and presenting the compiled simulation results. In accordance with some embodiments, a computer system includes one or more processors and memory storing one or more programs for execution by the one or more processors. The one or more programs include instructions for performing the method described above. In accordance with some embodiments, a non-transitory computer readable storage medium stores one or more programs for execution by one or more processors of a computer system. The one or more programs include instructions for performing the method described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIGS. 7A-7E are flowcharts illustrating a method of performing a breadth-first-search for an analysis of a digital circuit in accordance with some embodiments.

DESCRIPTION OF EMBODIMENTS

The computer systems and methods described herein enable more efficient and faster analysis of complex circuits.

FIGS. 1-4 illustrate computer systems that are used for performing an analysis of a digital circuit. FIGS. 5A-5G illustrate an exemplary digital circuit. FIG. 5H illustrates another exemplary digital circuit. FIG. 6 illustrates operations performed by computer systems in performing a breadth-first-search for an analysis of a digital circuit. FIGS. 7A-7E are flowcharts illustrating a method of performing a breadth-first-search for an analysis of a digital circuit in accordance with some embodiments. FIGS. 5A-5H are used to describe the operations shown in FIGS. 6 and 7A-7E.

Figure 1:
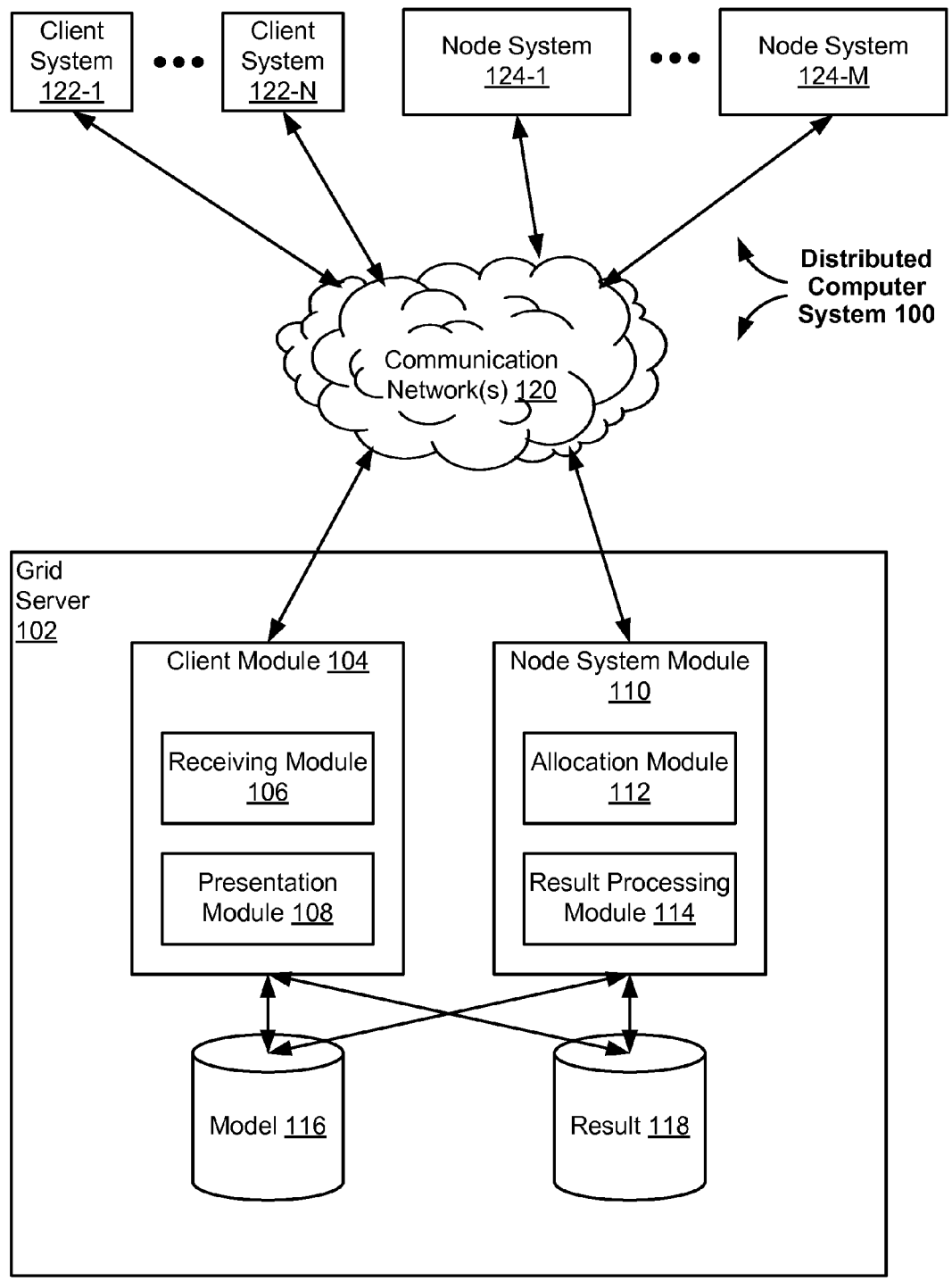
FIG. 1 is a block diagram illustrating a distributed computer system in accordance with some embodiments.

FIG. 1 is a block diagram illustrating a distributed computer system 100 in accordance with some embodiments. In FIG. 1, system 100 includes a grid server 102 and a plurality of node systems 124 (e.g., node system 124-1 through node system 124-M), and communication networks 120. In some embodiments, the distributed computer system 100 includes a plurality of client systems 122 (e.g., client system 122-1 through client system 122-N).

A client system 122 can be any computing device (e.g., a laptop computer, a desktop computer, a mobile phone, a handheld computer, etc.). The client system 122 typically includes a graphical user interface (GUI) for graphically displaying received information. The client system 122 is connected to a grid server 102 via communication networks 120.

The grid server 102 is a computer server configured to interact with node systems 124. In some embodiments, the grid server 102 includes a client module 104 and a node system module 110.

In some embodiments, the client module 104 includes a receiving module 106 for receiving a request from a client system 122 and a presentation module 108 for sending a response to the client system 122.

In some embodiments, the node system module 110 includes an allocation module 112 configured for allocating simulation tasks to the node systems 124 and a result processing module 114 configured for combining results from the node systems 124.

In some embodiments, the grid server 102 includes a model database 116 for storing one or more circuit models and/or a result database 118 for storing simulation results.

Figure 2:
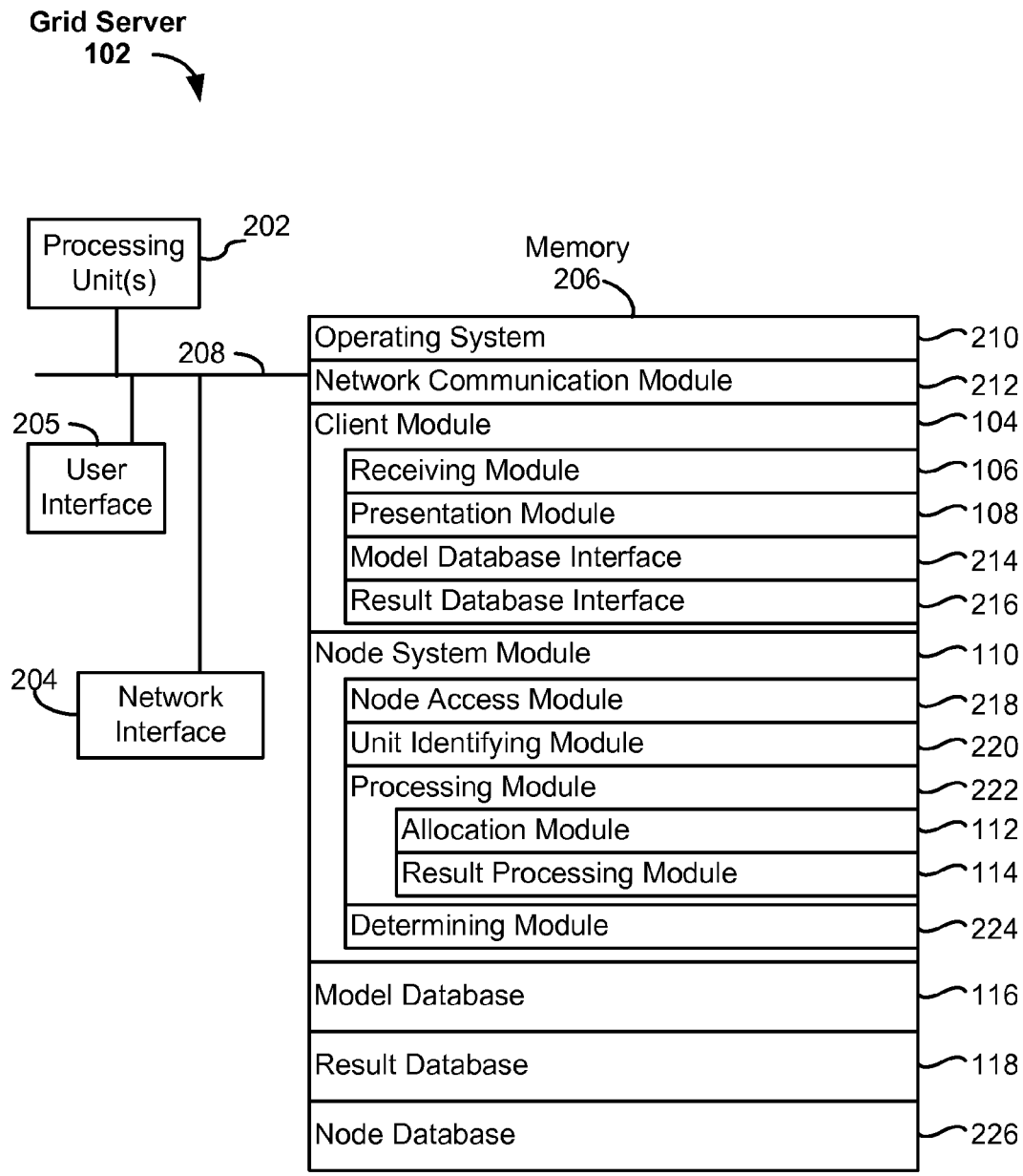
FIG. 2 is a block diagram illustrating a grid server in accordance with some embodiments.

FIG. 2 is a block diagram illustrating a grid server 102 in accordance with some embodiments.

The grid server 102 includes one or more processing units 202 (e.g., one or more central processing units (CPUs), one or more graphical processing units (GPUs), and one or more accelerated processing units (APUs)), one or more network or other communication interfaces 204, memory 206, and one or more communication buses 208 for interconnecting these components. A processing unit is also called herein a processor. In some embodiments, the grid server 102 includes a user interface 205 comprising a display device and one or more input devices, such as a keyboard, mouse, touchpad, touch screen and/or other input devices.

Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the Processing unit(s) 202. Memory 206, or alternatively the non-volatile memory device(s) within memory 206, comprises a non-transitory computer readable storage medium. In some embodiments, memory 206 or alternatively the non-transitory computer readable storage medium stores the following programs, modules and data structures, or a subset thereof:
  Operating System 210 that includes procedures for handling various basic system services and for performing hardware dependent tasks;
  Network Communication Module (or instructions) 212, configured for connecting the grid server 102 to other computers (e.g., node systems 124, client system 122, etc.) via one or more network interfaces 204 (wired or wireless) and one or more communication networks 120 (FIG. 1), such as the Internet, other wide area networks, local area networks, metropolitan area networks, and so on;
  Client Module 104;
  Node System Module 110;
  Model Database 116; and
  Result Database 118.

In some embodiments, the client module 104 includes the following components, or a subset or a superset thereof:
  Receiving Module 106;
  Presentation Module 108;

Model Database Interface 214 configured for accessing the Model Database 116 to retrieve and/or store data (e.g., information representing one or more digital circuits); and Result Database Interface 216 configured for accessing the Result Database 118 to retrieve and/or store data (e.g., simulation results).

In some embodiments, the node system module 110 includes the following components, or a subset or a superset thereof:

Node Access Module 218 configured for communications with node systems 124 in FIG. 1 (e.g., sending simulation tasks to the node systems, receiving results from the node systems, and/or monitoring the node systems, such as monitoring computing loads on node systems and/or identifying which node systems are available for processing additional tasks);

Unit Identifying Module 220 configured for identifying one or more digital circuit components;

Processing Module 222 configured for processing one or more digital circuit components; and Determining Module 224 configured for determining timing delays, noise injection, and power consumption of one or more digital circuit components.

In some embodiments, the processing module 222 includes the allocation module 112 and the result processing module 114. In some embodiments, the allocation module 112 allocates tasks based at least on computing loads on node systems. In some embodiments, the allocation module 112 allocates tasks also based on the condition of communication network(s) 120 (e.g., whether a network connection to a particular node system is congested). In some embodiments, the result processing module 114 processes results returned by node systems and stores them in the result database 118 and/or pass the results to the client system 122-1.

In some embodiments, the memory includes Node Database 226, which includes information identifying node systems 124 (FIG. 1) that are available to the grid server 102 (e.g., node systems that are configured to receive simulation tasks from the grid server 102). In some embodiments, the Node Database 226 also includes information used for communicating with the node systems 124, such as communication protocols, security protocols, data format, etc. The information in the Node Database 226 is typically used by the Node Access Module 218 in communications with the node systems 124.

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 206 stores a subset of the modules and data structures identified above. Furthermore, in some embodiments, memory 206 stores additional modules and data structures not described above.

Although FIG. 2 shows the Grid Server 102 in accordance with some embodiments, as recognized by those of ordinary skill in the art, items shown separately could be combined and some items could be separated. For example, the client module 104 and the node system module 110 may be combined in a single module.

Some items shown separately in FIG. 2 could be implemented on single servers and single items could be implemented by one or more servers. For example, in some embodiments, the client application 104 and the node system module 110 are implemented in separate servers. The actual number of servers used to implement the Grid Server 102 and how features are allocated among them will vary from one implementation to another, and optionally depends in part on the amount of data traffic that the server must handle during peak usage periods as well as during average usage periods.

Figure 3:
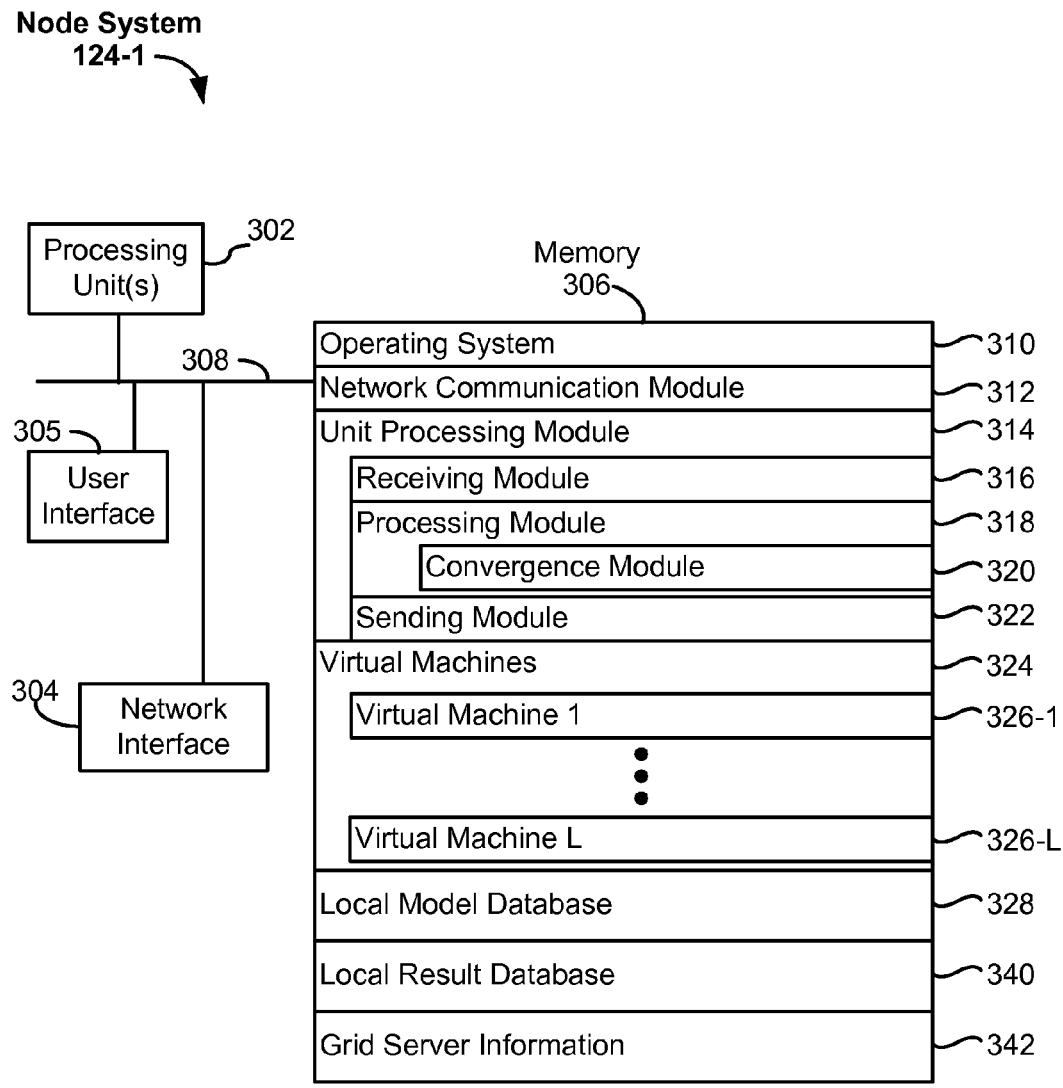
FIG. 3 is a block diagram illustrating a node system in accordance with some embodiments.

FIG. 3 is a block diagram illustrating a node system 124-1 in accordance with some embodiments.

The node system 124-1 includes one or more processing units 302 (e.g., one or more central processing units (CPUs), one or more graphical processing units (GPUs), and one or more accelerated processing units (APUs)), one or more network or other communication interfaces 304, memory 306, and one or more communication buses 308 for interconnecting these components. In some embodiments, the node system 124-1 includes a user interface 305 comprising a display device and one or more input devices, such as a keyboard, mouse, touchpad, touch screen and/or other input devices.

Memory 306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the processing unit(s) 302. Memory 306, or alternatively the non-volatile memory device(s) within memory 306, comprises a non-transitory computer readable storage medium. In some embodiments, memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312, configured for connecting the node system 124-1 to other computers (e.g., grid server 102, etc.) via one or more network interfaces 304 (wired or wireless) and one or more communication networks 120 (FIG. 1), such as the Internet, other wide area networks, local area networks, metropolitan area networks, and so on;

Unit Processing Module 314 configured for processing a task corresponding to one or more components allocated to the node system 124-1;

Virtual Machines 324 that include instructions and data to operate one or more virtual machines, such as Virtual Machine 1 (326-1) through Virtual Machine L (326-L);

Local Model Database 328 storing information identifying a subset of the digital circuit (e.g., a portion of the digital circuit that corresponds to a task allocated to the node system 124-1);

Local Result Database 330 storing one or more results from processing the one or more components allocated to the node system 124-1; and Grid Server Information 332 identifying the grid server 102 (FIG. 1) and/or information used for communications with the grid server 102 (e.g., communications protocol and/or security protocols, etc.).

In some embodiments, the unit processing module 314 includes the following components, or a subset or a superset thereof:

Receiving Module 316 configured for receiving simulation tasks from the grid server 102 (FIG. 1);

Processing Module 318 configured for processing the simulation tasks (e.g., performing simulations); and Sending Module 322 configured for sending simulation results to the grid server 102.

In some embodiments, the processing module 318 includes Convergence Module 320 configured for determining whether one or more simulation results satisfy convergence criteria.

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 306 stores a subset of the modules and data structures identified above. Furthermore, in some embodiments, memory 306 stores additional modules and data structures not described above.

Although FIG. 3 shows the node system 124-1 in accordance with some embodiments, as recognized by those of ordinary skill in the art, items shown separately could be combined and some items could be separated. For example, the receiving module 316 and the sending module 322 may be combined in a single module.

Although FIG. 3 illustrates the node system 124-1, other node systems (e.g., node system 124-M, FIG. 1) may have a structure analogous to the structure of the node system 124-1.

Figure 4:
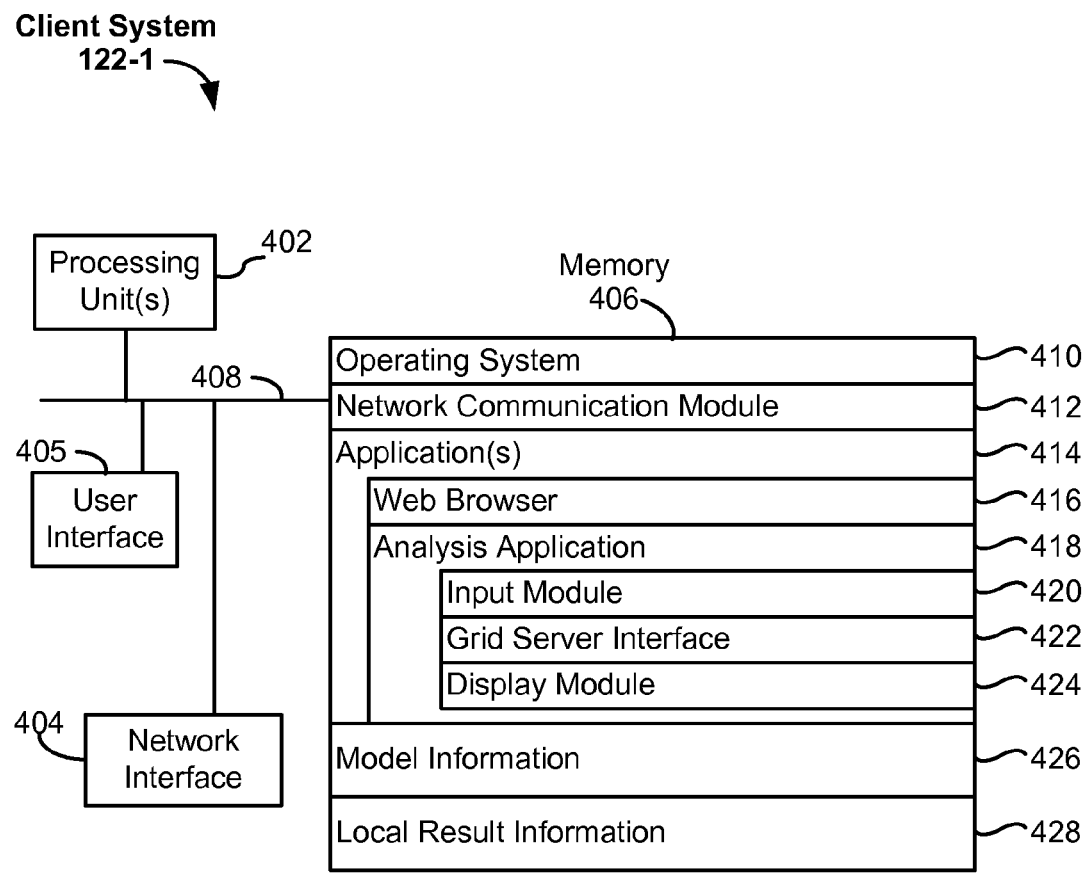
FIG. 4 is a block diagram illustrating a client system in accordance with some embodiments.

FIG. 4 is a block diagram illustrating a client system 122-1 in accordance with some embodiments.

The client system 122-1 includes one or more processing units 402 (e.g., one or more central processing units (CPUs), one or more graphical processing units (GPUs), and one or more accelerated processing units (APUs)), one or more network or other communication interfaces 404, memory 406, and one or more communication buses 408 for interconnecting these components. The client system 122-1 also includes a user interface 405 comprising a display device and one or more input devices, such as a keyboard, mouse, touchpad, touch screen and/or other input devices.

Memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the processing unit(s) 402. Memory 406, or alternatively the non-volatile memory device(s) within memory 406, comprises a non-transitory computer readable storage medium. In some embodiments, memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412, configured for connecting the client system 122-1 to other computers (e.g., grid server 102, etc.) via one or more network interfaces 404 (wired or wireless) and one or more communication networks 120 (FIG. 1), such as the Internet, other wide area networks, local area networks, metropolitan area networks, and so on; and One or more Applications 414.

In some embodiments, the one or more applications 414 include a web browser, which is used for accessing the grid server 102 (e.g., through an HTML-based user interface).

In some embodiments, the one or more applications 414 include Analysis Application 418 configured for requesting a simulation of a digital circuit and/or displaying a result of the simulation. The Analysis Application 418 includes the following programs, modules and data structures, or a superset or a subset thereof:

Input Module 416 configured for processing a received user input;

Grid Server Interface 422 used for communications with the grid server 102 (e.g., sending a digital circuit or a corresponding model, or a portion thereof to the grid server 102 and receiving results from the grid server 102); and Display Module 424 configured for preparing displaying a graphical user interface on the display device of the client system 122-1.

In some embodiments, the memory 406 includes model information 426 that represents one or more digital circuits. For example, information representing a digital circuit may be sent to the grid server 102 by the grid server interface 422 of the analysis application 418 to initiate processing of the digital circuit.

In some embodiments, the memory 406 includes local result information 428 representing a result of processing the digital circuit. Information in the local result information 428 is typically received from the grid server 102 and retrieved for displaying the information using a graphical user interface on the display device of the client system 122-1.

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 406 stores a subset of the modules and data structures identified above. Furthermore, in some embodiments, memory 406 stores additional modules and data structures not described above.

Although FIG. 4 shows the client system 122-1 in accordance with some embodiments, as recognized by those of ordinary skill in the art, items shown separately could be combined and some items could be separated.

Although FIG. 4 illustrates the client system 122-1, other client systems (e.g., client system 122-N, FIG. 1) may have a structure analogous to the structure of the client system 122-1.

As shown above, FIGS. 1-4 illustrate a distributed computer system in which the grid server 102 performs various tasks including such as identifying one or more components in a digital circuit and combining results sent by the node systems.

In some embodiments, the client system 122-1 performs one or more of these tasks (e.g., identifying one or more components in a digital circuit and combining results sent by the node systems). In such embodiments, the grid server 102 may serve as a gateway to the node systems. In some embodiments, the grid server 102 does not include the model database 116, and the client system 122-1 sends instructions with information that corresponds to a portion of a digital circuit. In some embodiments, the client system 122-1 includes the convergence module 320 so that the client system 122-1 determines whether one or more simulation results from a node system satisfy convergence criteria.

In some embodiments, the node systems 124 perform one or more of these tasks (e.g., identifying one or more components in a digital circuit and combining results sent by the node systems). In some embodiments, one or more of the node systems 124 include the model database 116. In some embodiments, the node systems 124 are configured to communicate with one another without going through the grid server 102.

FIG. 5A-5G illustrate an exemplary digital circuit in accordance with some embodiments.

Figure 5A:
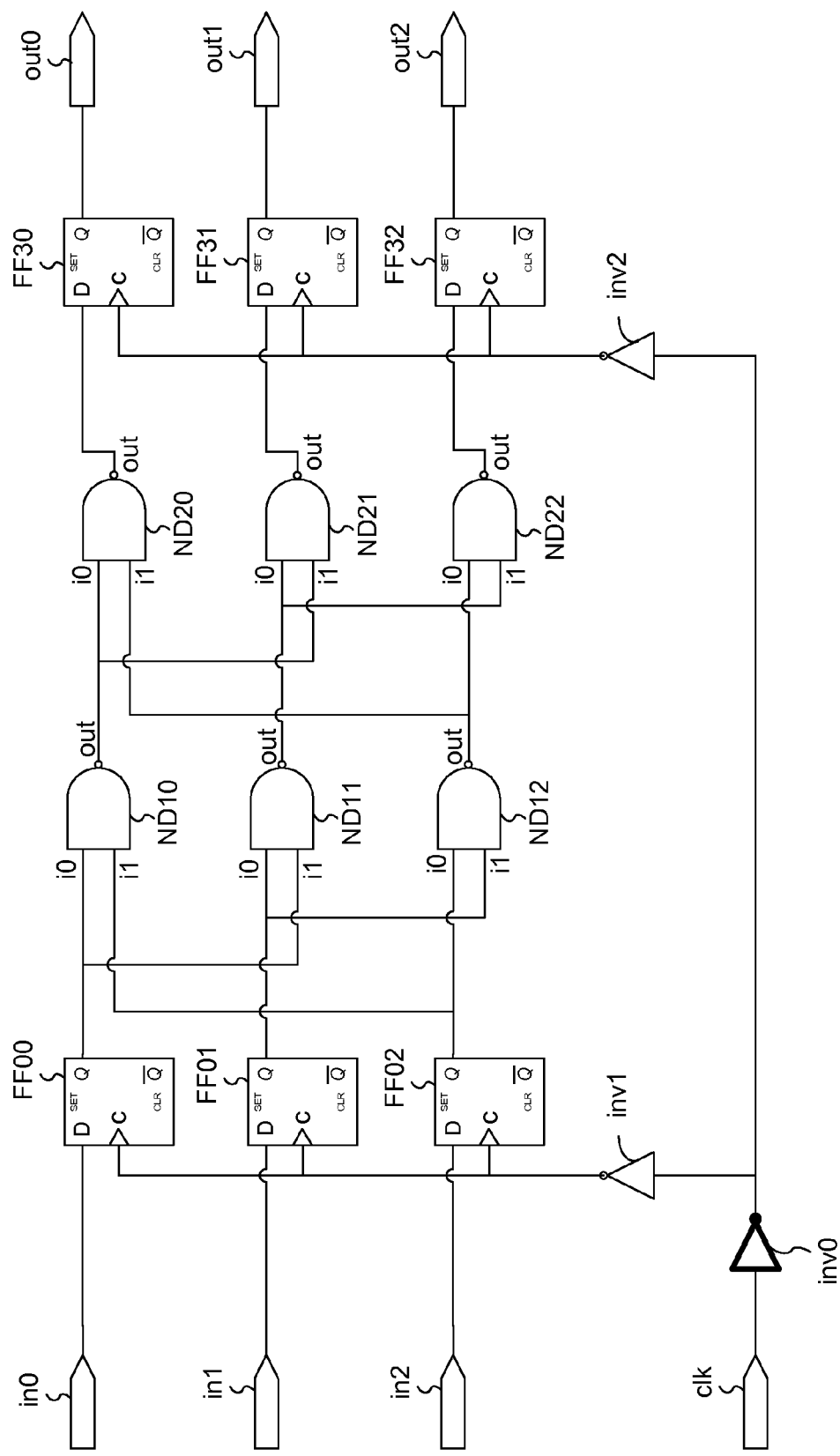
FIGS. 5A-5G illustrate an exemplary digital circuit in accordance with some embodiments.
Figure 6:
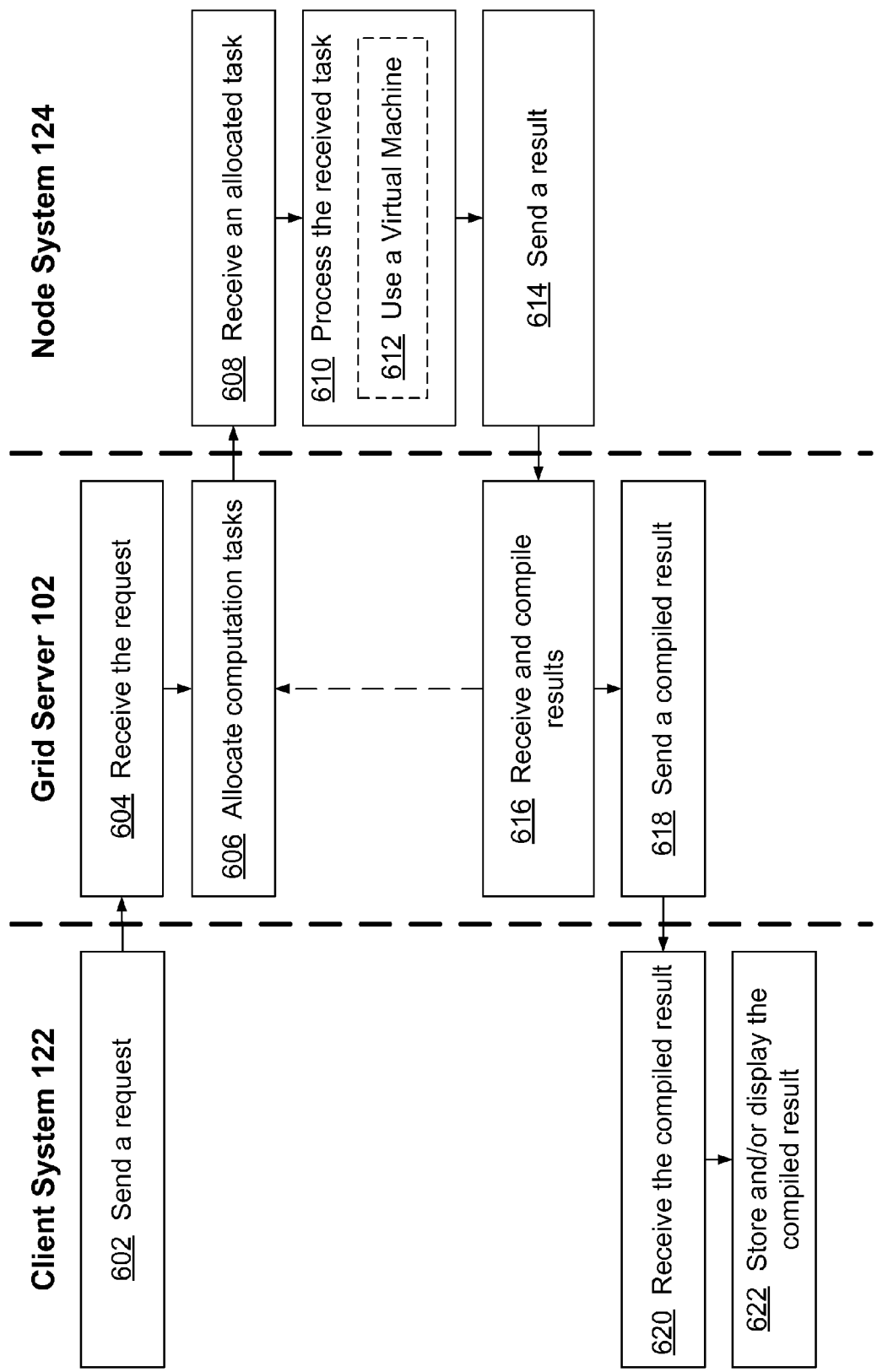
FIG. 6 is a sequence diagram illustrating operations performed by a distributed computing system in accordance with some embodiments.
Figure 7A:
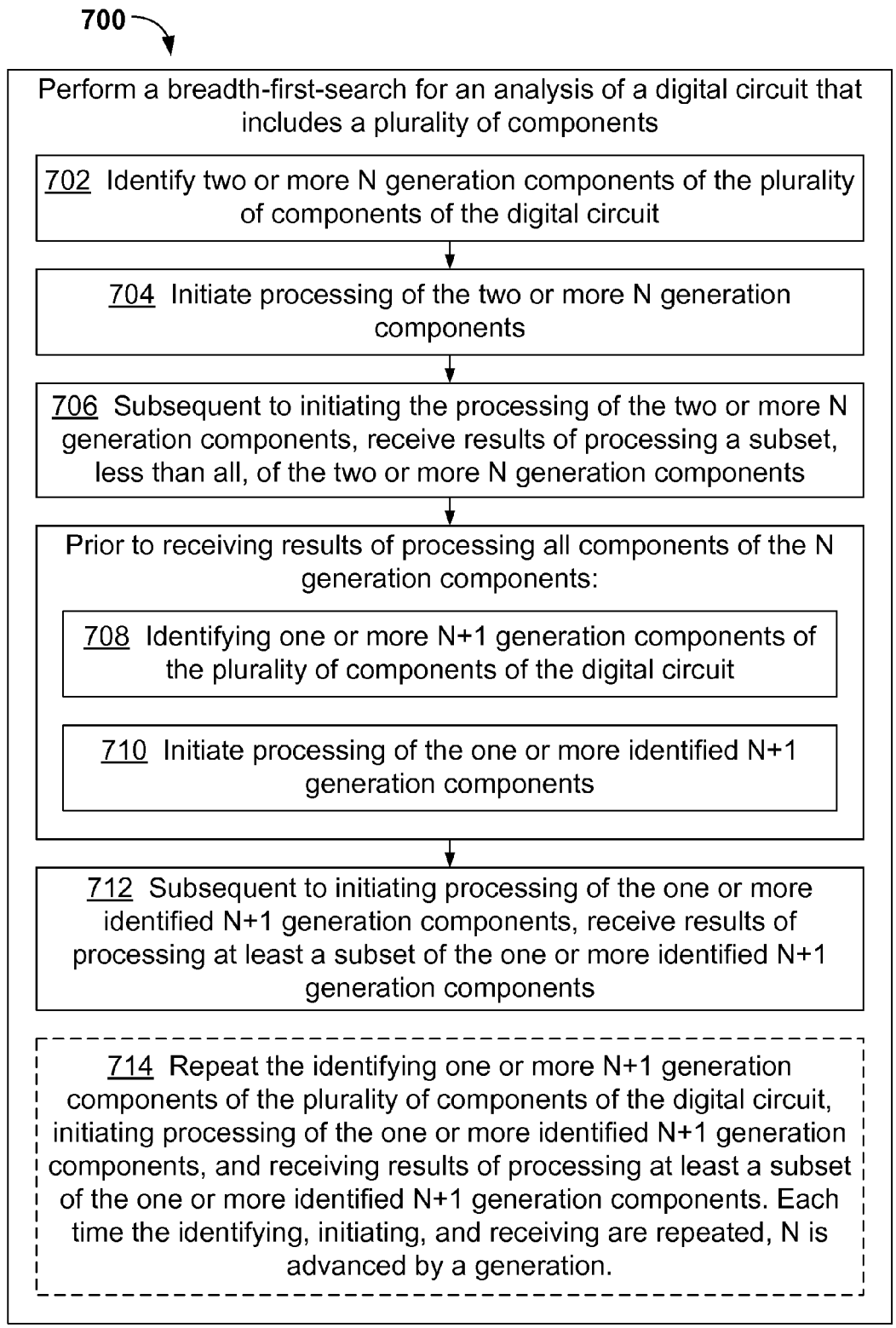

In FIG. 5A, the circuit includes inverters (inv0, inv1, and inv2), flip-flops (FF00, FF01, FF02, FF30, FF31, and FF32), and NAND gates (ND10, ND11, ND12, ND20, ND21, and ND22). The flip-flops shown in FIG. 5A are data flip-flops.

Input in0 is coupled to a data pin (labeled D) of FF00, input in1 is coupled to a data pin of FF01, and input in2 is coupled to a data pin of FF02. Clock signal clk is coupled to an input of an inverter inv0, and an output of the inverter inv0 is coupled with an input of inverters inv1 and inv2. An output of the inverter inv1 is coupled with clock pins (labeled C) of FF00, FF01, and FF02. An output of the inverter inv2 is coupled with clock pins of FF30, FF31, and FF32. An output (labeled Q) of FF00 is coupled with an input i0 of the NAND gate ND10 and an input i1 of the NAND gate ND11. An output of FF01 is coupled with an input I0 of the NAND gate ND11 and an input i1 of the NAND gate ND12. An output of FF02 is coupled with an input i1 of the NAND gate ND10 and an input i0 of the NAND gate ND12. An output of the NAND gate ND10 is coupled with an input i0 of the NAND gate ND20 and an input i1 of the NAND gate ND21. An output of the NAND gate ND11 is coupled with an input i0 of the NAND gate ND21 and an input i1 of the NAND gate ND22. An output of the NAND gate ND12 is coupled with an input i1 of the NAND gate ND20 and an input i0 of the NAND gate ND22. An output of the NAND gate ND20 is coupled with a data pin of FF30. An output of the NAND gate ND21 is coupled with a data pin of FF31. An output of the NAND gate ND22 is coupled with a data pin of FF32. An output of FF30 is coupled with output out0. An output of FF31 is coupled with output out1. An output of FF32 is coupled with output out2.

In some embodiments, a component of the digital circuit includes one input pin and one output pin. A delay from an input pin to an output pin is called a timing arc or a delay arc.

Clock signal clk typically includes square wave signals. In some embodiments, analysis of the circuit includes analysis of properties or performance characteristics of a respective component. In FIG. 5A, the inverter inv0 is highlighted to indicate that the inverter inv0 is processed (e.g., the performance characteristics of the inverter inv0, such as timing delays, noise injection, and/or power consumption, are determined). For example, timing delay associated with the inverter inv0 varies depending on process variation (e.g., the size, such as lengths, widths, and thicknesses, of components, such as transistors and resistors, in the inverter inv0), parasitic of path (wire) driven by its output, input capacitance of inv1 and inv2, and waveform of input signals.

Figure 5B:
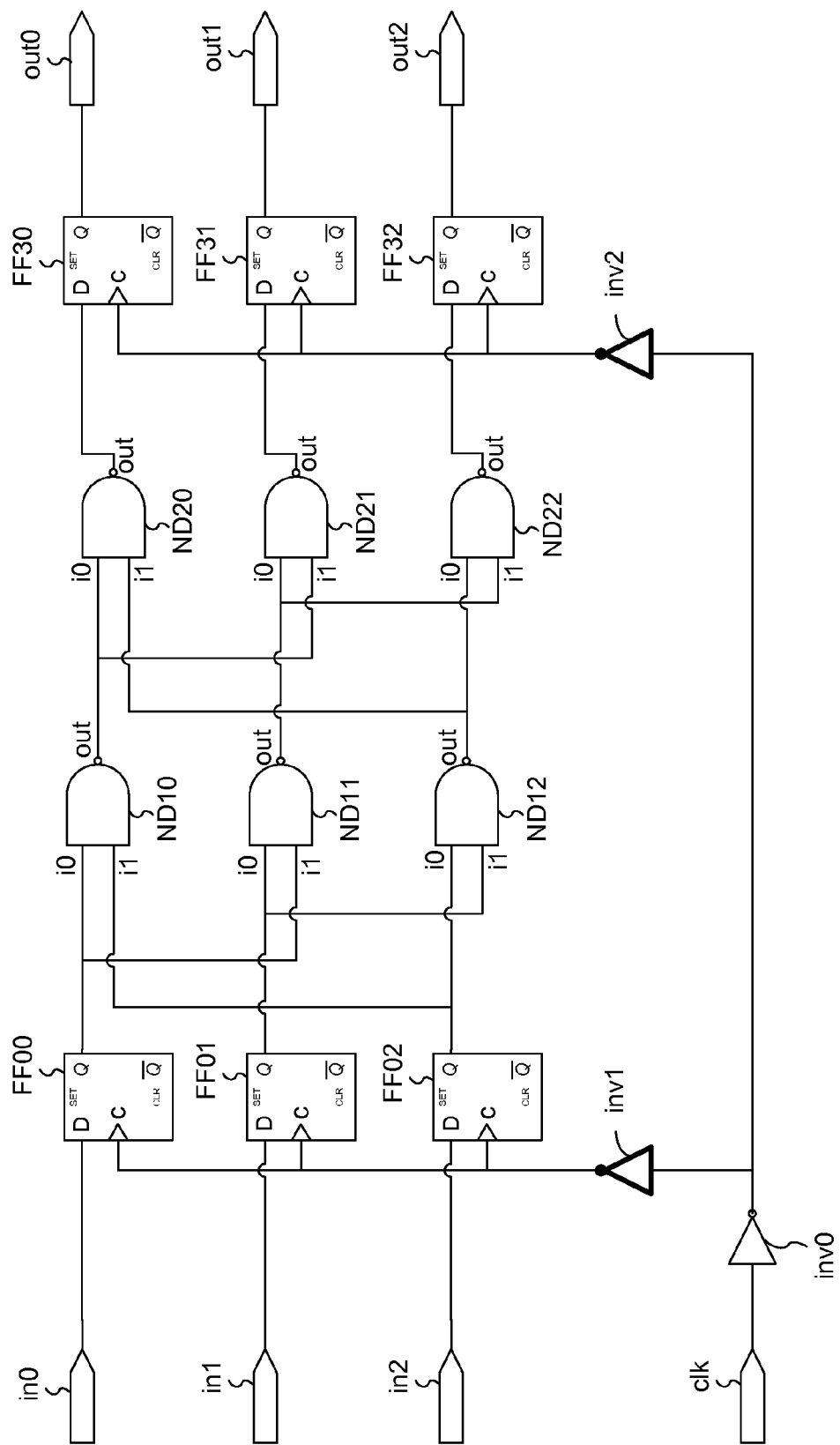

In FIG. 5B, the inverter inv1 and the inverter inv2 are highlighted, indicating that these two components are processed (e.g., analyzed for a timing delay, noise injection, and/or power consumption) after processing the inverter inv0 (FIG. 5A).

In some embodiments, coupling between two paths are also determined. For example, when the path from the output of ND12 to the input i0 of ND22 is coupled with the path from the output of inv0 to the input of inv2, a signal from the output of ND12 to the input i0 of ND22 affects a signal from the output of inv0 to the input of inv2, and a signal from the output of inv0 to the input of inv2 affects a signal from the output of ND12 to the input i0 of ND22. Similarly, when the path from the output of FF02 to the input i0 of ND12 is coupled with the path from the output of inv0 to the input of inv2, a signal from the output of FF02 to the input i0 of ND12 affects a signal from the output of inv0 to the input of inv2, and a signal from the output of inv0 to the input of inv2 affects a signal from the output of FF02 to the input i0 of ND12. Such coupling effects are sometimes called noise injection. In some cases, the coupling effects change timing performance of the circuit (e.g., a rise time or a fall time in a clock signal may increase or decrease due to a coupling signal).

Thus, in some embodiments, coupling effects on the inverter inv2 need to be analyzed.

Figure 5C:
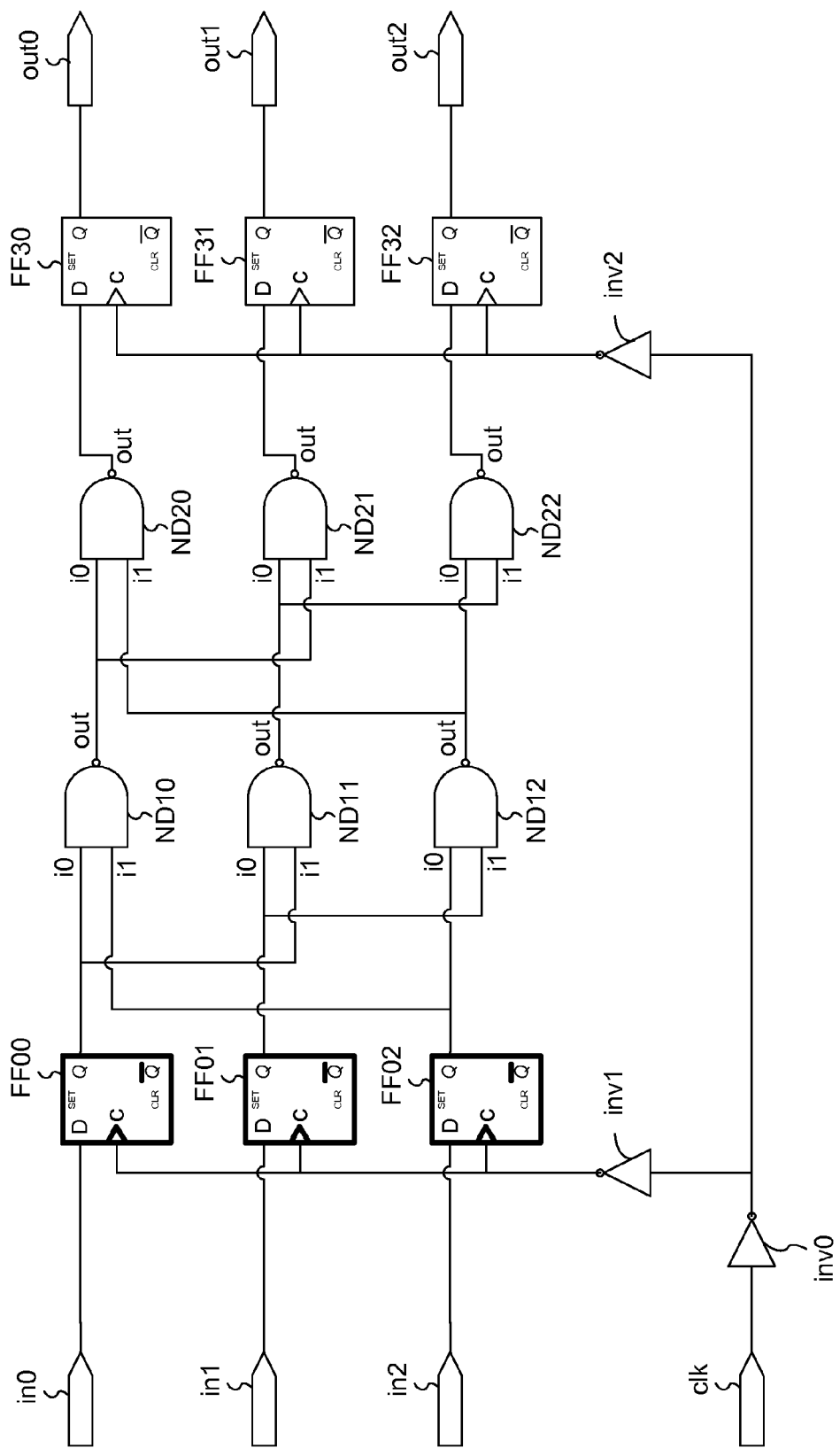

FIG. 5C illustrates that the flip-flops FF00, FF01, and FF02 are highlighted, indicating that C pin to Q pin delay arcs of these three flip-flops are processed (e.g., analyzed for a timing delay, noise injection, and/or power consumption) after processing at least the inverter inv1.

Figure 5D:
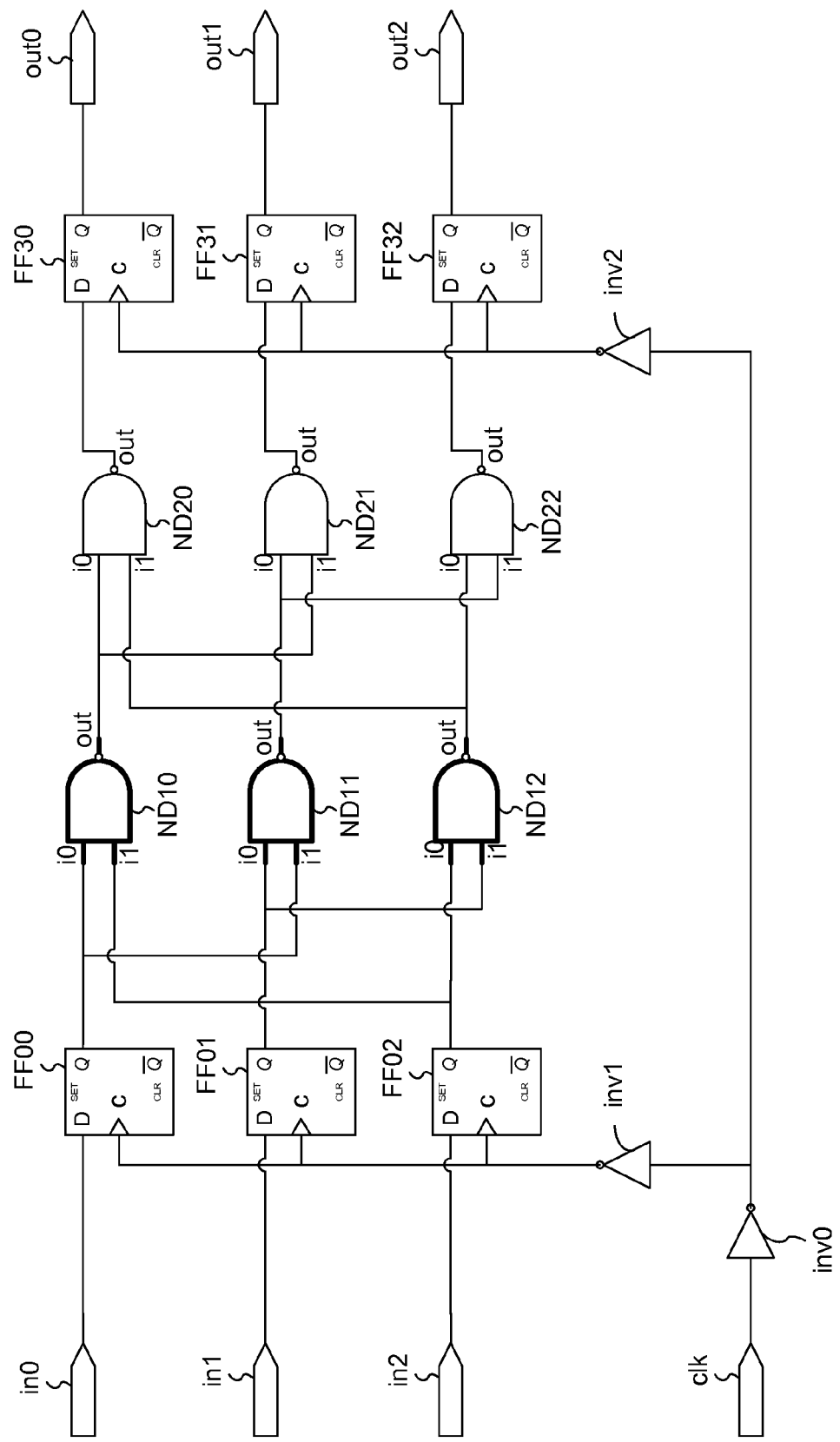

FIG. 5D illustrates that ND10, ND11, and ND12 are highlighted, indicating that various delay arcs from in0 pin or in1 pin to out pin of these three components are processed (e.g., analyzed for a timing delay, noise injection, and/or power consumption) after processing the flip-flops FF00, FF01, and FF02.

Figure 5E:
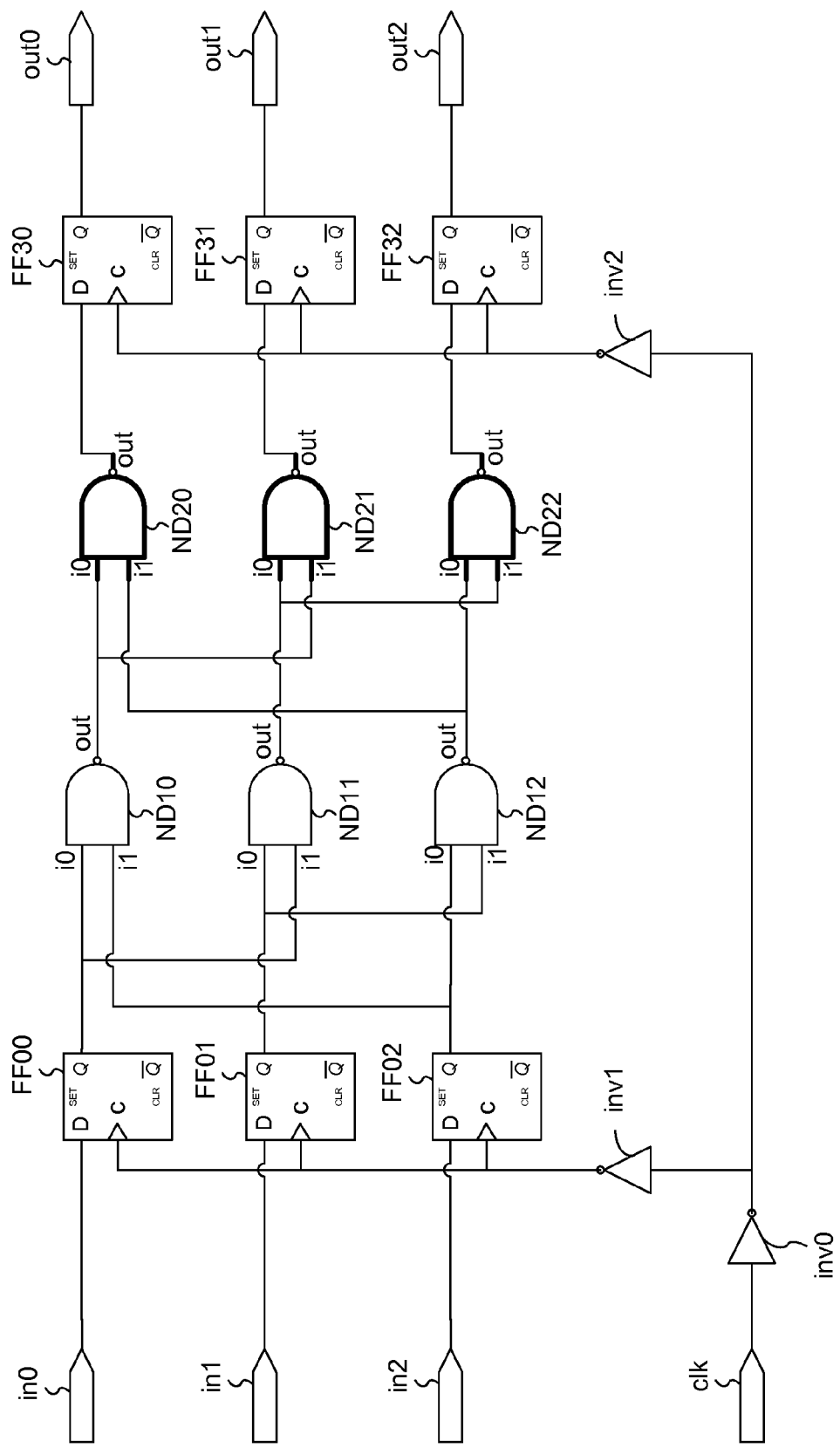

FIG. 5E illustrates that ND20, ND21, and ND22 are highlighted, indicating that various delay arcs from in0 pin or in1 pin to out pin of these three components are processed (e.g., analyzed for a timing delay, noise injection, and/or power consumption) after processing ND10, ND11, and ND12.

Figure 5F:
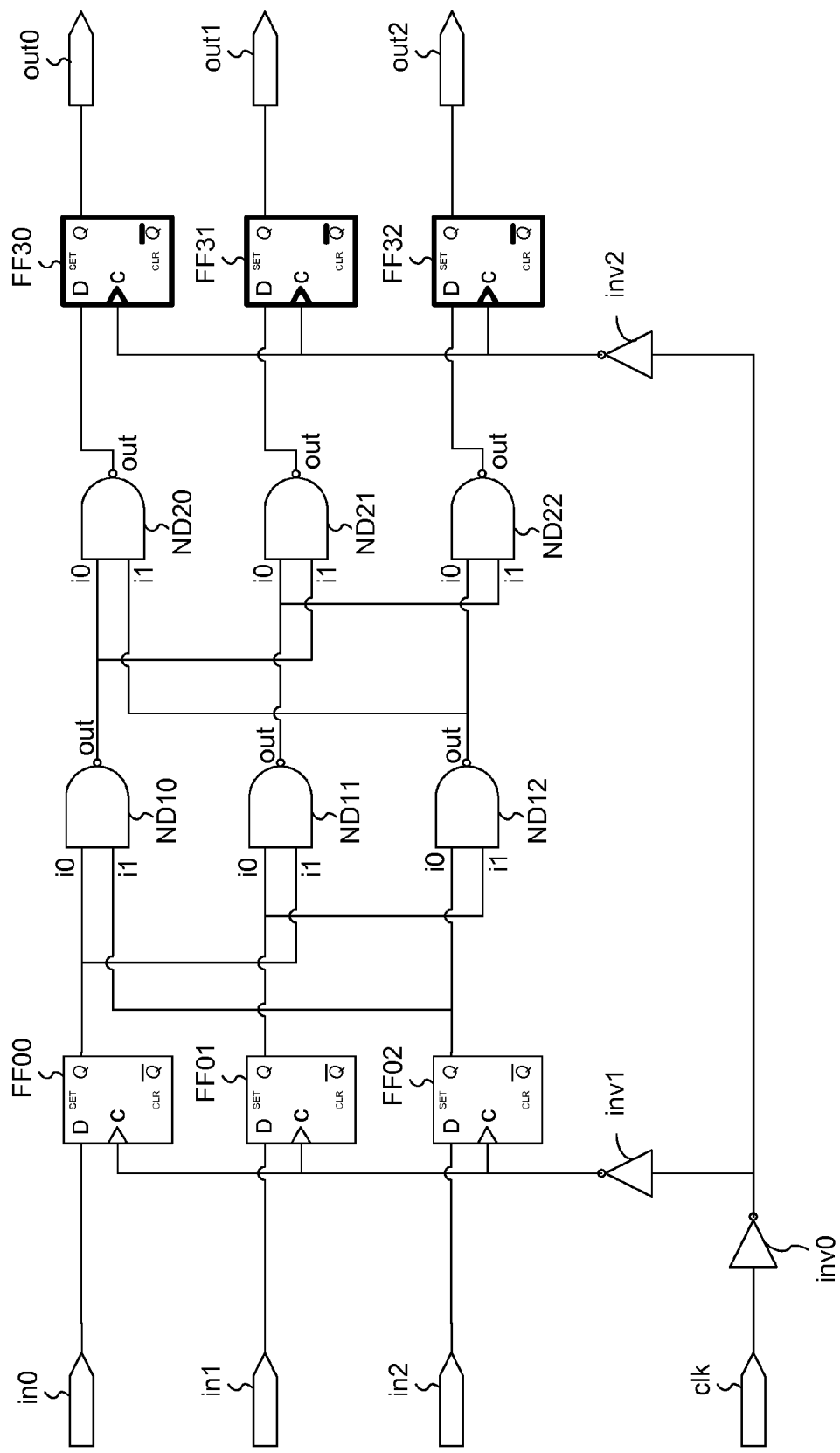

FIG. 5F illustrates that the flip-flops FF30, FF31, and FF32 are highlighted, indicating that C pin to Q pin delay arcs of these three flip-flops are processed (e.g., analyzed for a timing delay, noise injection, and/or power consumption) after processing the inverter inv2.

Figure 5G:
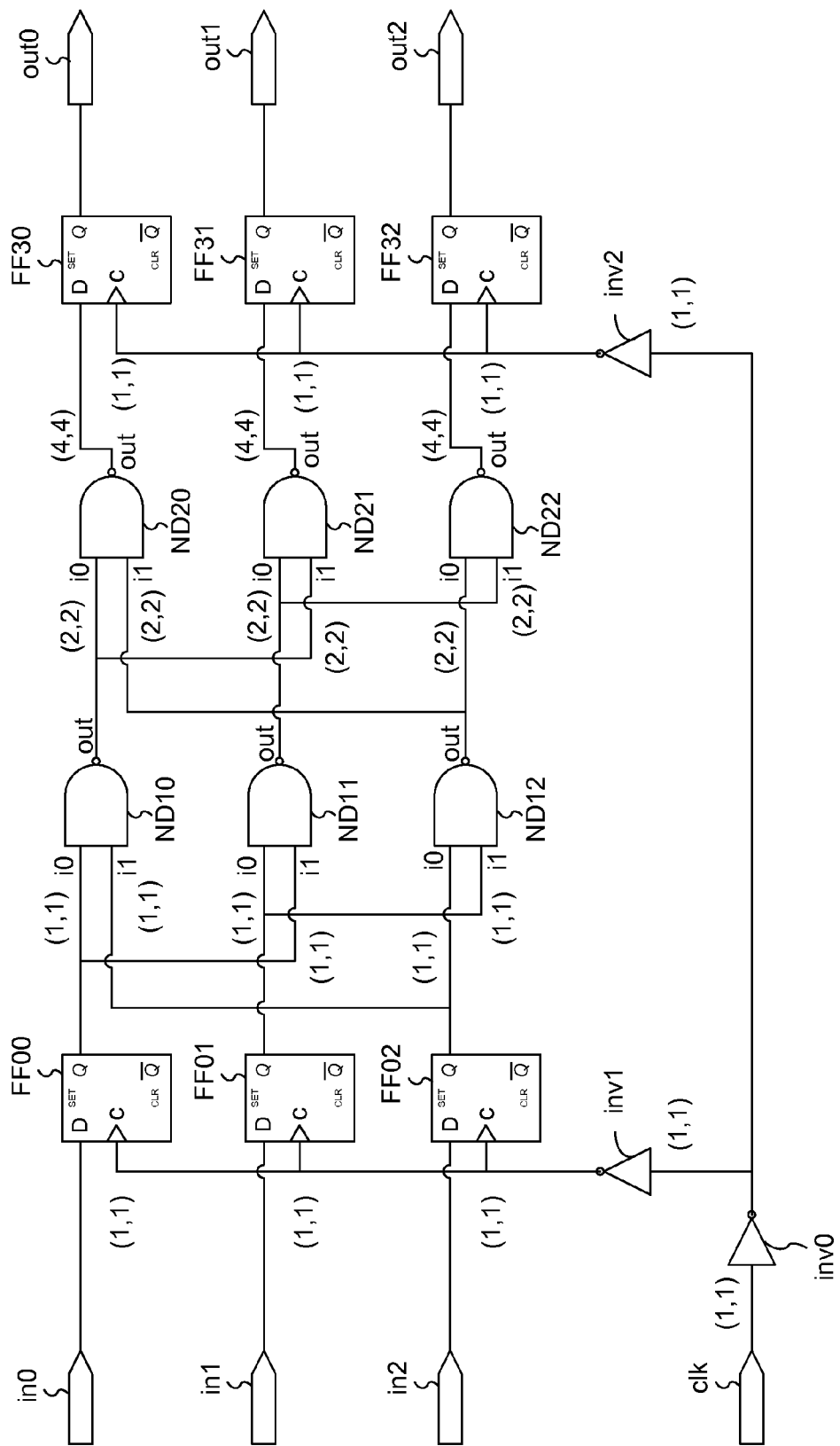
Figure 5H:
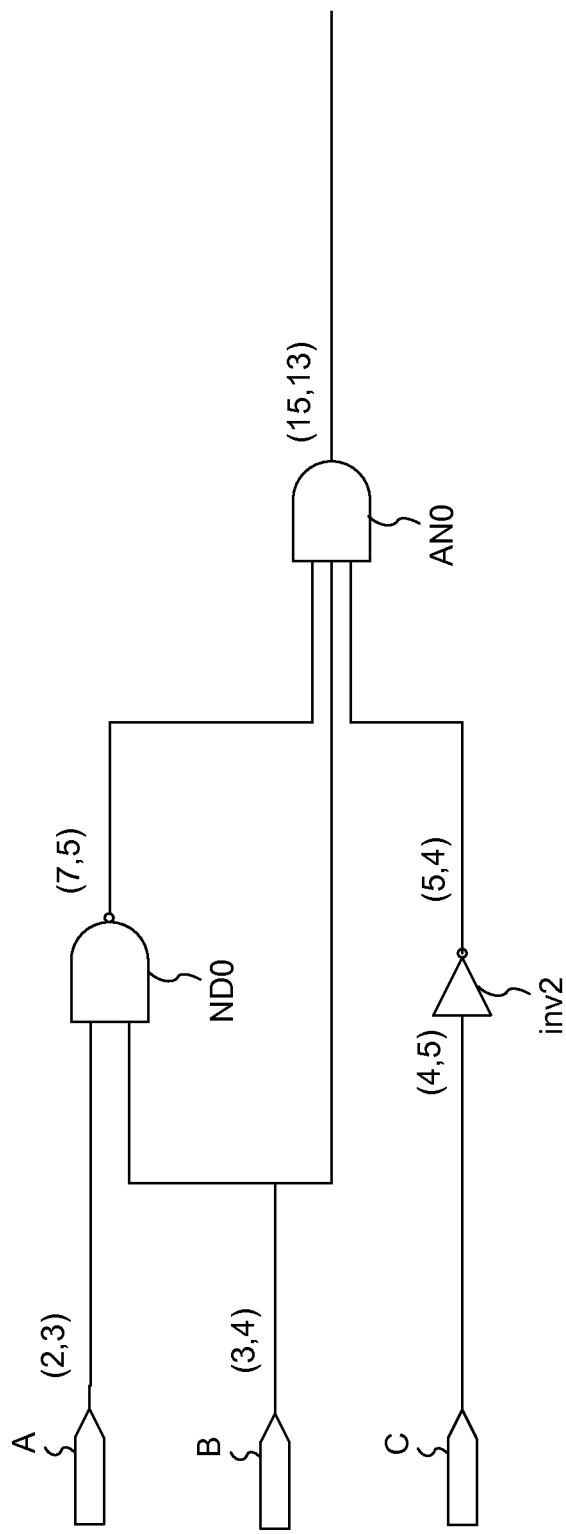
FIG. 5H illustrates another exemplary digital circuit in accordance with some embodiments.

FIG. 5G illustrates the method of analyzing the circuit with a number of rising waveforms and a number of falling waveforms for respective components in accordance with some embodiments. For simplicity, the method of analyzing the circuit is described for a case that the circuit does not have on-chip variation and the clock signal has no jitter. However, a person having ordinary skill in the art would understand that the described method can be applied for cases when the circuit has on-chip variation and/or the clock signal has a jitter, in analogous manners.

The clock signal in FIG. 5G has one rising waveform and one falling waveform, which is indicated in FIG. 5G as "(1, 1)." As illustrated in FIG. 5A, from the input to the inverter inv0 (which also has one rising waveform and one falling waveform, and thus, is annotated with "(1, 1)"), the inputs to the inverters inv1 and inv2 are determined (called herein "simulation 1"). Although the inputs to the inverters inv1 and inv2 originate from the same source, namely the output of the inverter inv0, the inputs to the inverters inv1 and inv2 are typically different (from each other) due to different parasitics in the circuit (e.g., different resistance and capacitance from the inverter inv0 to the inverters inv1 and inv2).

Based on the input to the inverter inv1 (e.g., a falling waveform), inputs (e.g., clock signal) to the flip-flops FF00, FF01, and FF02 are determined (called herein "simulation 2"). Although the inputs to the flip-flops FF00, FF01, and FF02 originate from the same source, namely the output of the inverter inv1, the inputs to the flip-flops FF00, FF01, and FF02 are typically different (from one another) due to different parasitics in the circuit (e.g., different resistance and capacitance from the inverter inv1 to the flip-flops FF00, FF01, and FF02).

In addition, based on the input to the inverter inv2 (e.g., a falling waveform), inputs (e.g., clock signal) to the flip-flops FF30, FF31, and FF32 are determined (called herein "simulation 3"). Although the inputs to the flip-flops FF30, FF31, and FF32 originate from the same source, namely the output of the inverter inv2, the inputs to the flip-flops FF30, FF31, and FF32 are typically different (from one another) due to different parasitics in the circuit (e.g., different resistance and capacitance from the inverter inv2 to the flip-flops FF30, FF31, and FF32).

When that the flip-flop FF00 is configured to trigger on a rising edge, the clock signal for the flip-flop FF00 with a rising waveform (e.g., a rising waveform determined from simulation 2) is used as an input to the flip-flop FF00, and inputs to the NAND gates ND10 and ND11 are determined. Although the inputs to the NAND gates ND10 and ND11 originate from the same source, namely the output of the flip-flop FF00, the inputs to the NAND gates ND10 and ND11 are typically different (from each other) due to different parasitics in the circuit (e.g., different resistance and capacitance from the flip-flop FF00 to respective NAND gates ND10 and ND11).

In some embodiments, the determination of the inputs to the NAND gates ND10 and ND11 is performed at least twice: once for when the output of the flip-flop FF00 is initially (e.g., before the clock signal) at a logic low state (called herein "simulation 4") and the second time when the output of the flip-flop FF00 is initially (e.g., before the clock signal) in a logic high state (called herein "simulation 5").

Similarly, based on inputs to the flip-flop FF01 (e.g., a rising waveform determined from simulation 2), inputs to the NAND gates ND11 and ND12 are determined. Although the inputs to the NAND gates ND11 and ND12 originate from the same source, namely the output of the flip-flop FF00, the inputs to the NAND gates ND11 and ND12 are typically different (from each other) due to different parasitics in the circuit (e.g., different resistance and capacitance from the flip-flop FF00 to respective NAND gates ND11 and ND12).

In some embodiments, the determination of the inputs to the NAND gates ND11 and ND12 is performed at least twice: once for when the output of the flip-flop FF01 is initially (e.g., before the clock signal) at a logic low state (called herein "simulation 6") and the second time when the output of the flip-flop FF01 is initially (e.g., before the clock signal) in a logic high state (called herein "simulation 7").

In addition, based on inputs to the flip-flop FF02 (e.g., a rising waveform determined from simulation 2), inputs to the NAND gates ND10 and ND12 are determined. Although the inputs to the NAND gates ND10 and ND12 originate from the same source, namely the output of the flip-flop FF02, the inputs to the NAND gates ND10 and ND12 are typically different (from each other) due to different parasitics in the circuit (e.g., different resistance and capacitance from the flip-flop FF02 to respective NAND gates ND10 and ND12).

In some embodiments, the determination of the inputs to the NAND gates ND10 and ND12 is performed at least twice: once for when the output of the flip-flop FF02 is initially (e.g., before the clock signal) at a logic low state (called herein "simulation 8") and the second time when the output of the flip-flop FF02 is initially (e.g., before the clock signal) in a logic high state (called herein "simulation 9").

Based on the input i0 to the NAND gate ND10 (e.g., a rising waveform determined from simulation 4), the input i0 to the NAND gate ND20 and the input i1 to the NAND gate ND21 are determined (called herein "simulation 10"). In some embodiments, the input i1 to the NAND gate ND10 is assumed to be in a logic high state. Although the inputs to the NAND gates ND20 and ND21 originate from the same source, namely the output of the NAND gate ND10, the input i0 to the NAND gate ND20 and the input i1 to the NAND gate ND21 are typically different (from each other) due to different parasitics in the circuit (e.g., different resistance and capacitance from the NAND gate ND10 to respective NAND gates ND20 and ND21).

In addition, based on the input i0 to the NAND gate ND10 (e.g., a falling waveform determined from simulation 5), the input i0 to the NAND gate ND20 and the input i1 to the NAND gate ND21 are determined (called herein "simulation 11"). Again, although the inputs to the NAND gates ND20 and ND21 originate from the same source, namely the output of the NAND gate ND10, the input i0 to the NAND gate ND20 and the input i1 to the NAND gate ND21 are typically different (from each other) due to different parasitics in the circuit (e.g., different resistance and capacitance from the NAND gate ND10 to respective NAND gates ND20 and ND21).

Similarly, based on the input i1 to the NAND gate ND10 (e.g., a rising waveform determined from simulation 8), the input i0 to the NAND gate ND20 and the input i1 to the NAND gate ND21 are determined (called herein "simulation 12"). In some embodiments, the input i0 to the NAND gate ND10 is assumed to be in a logic high state. Although the inputs to the NAND gates ND20 and ND21 originate from the same source, namely the output of the NAND gate ND10, the input i0 to the NAND gate ND20 and the input i1 to the NAND gate ND21 are typically different (from each other) due to different parasitics in the circuit (e.g., different resistance and capacitance from the NAND gate ND10 to respective NAND gates ND20 and ND21).

In addition, based on the input i1 to the NAND gate ND10 (e.g., a falling waveform determined from simulation 9), the input i0 to the NAND gate ND20 and the input i1 to the NAND gate ND21 are determined (called herein "simulation 13"). Again, although the inputs to the NAND gates ND20 and ND21 originate from the same source, namely the output of the NAND gate ND10, the input i0 to the NAND gate ND20 and the input i1 to the NAND gate ND21 are typically different (from each other) due to different parasitics in the circuit (e.g., different resistance and capacitance from the NAND gate ND10 to respective NAND gates ND20 and ND21).

Based on the input i0 to the NAND gate ND11 (e.g., a rising waveform determined from simulation 6), the input i0 to the NAND gate ND21 and the input i1 to the NAND gate ND22 are determined (called herein "simulation 14"). In some embodiments, the input i1 to the NAND gate ND11 is assumed to be in a logic high state. Although the inputs to the NAND gates ND21 and ND22 originate from the same source, namely the output of the NAND gate ND11, the input i0 to the NAND gate ND21 and the input i1 to the NAND gate ND22 are typically different (from each other) due to different parasitics in the circuit (e.g., different resistance and capacitance from the NAND gate ND11 to respective NAND gates ND21 and ND22).

In addition, based on the input i0 to the NAND gate ND11 (e.g., a falling waveform determined from simulation 7), the input i0 to the NAND gate ND21 and the input i1 to the NAND gate ND22 are determined (called herein "simulation 15"). Again, although the inputs to the NAND gates ND21 and ND22 originate from the same source, namely the output of the NAND gate ND11, the input i0 to the NAND gate ND21 and the input i1 to the NAND gate ND22 are typically different (from each other) due to different parasitics in the circuit (e.g., different resistance and capacitance from the NAND gate ND11 to respective NAND gates ND21 and ND22).

Similarly, based on the input i1 to the NAND gate ND11 (e.g., a rising waveform determined from simulation 4), the input i0 to the NAND gate ND21 and the input i1 to the NAND gate ND22 are determined (called herein "simulation 16"). In some embodiments, the input i0 to the NAND gate ND11 is assumed to be in a logic high state. Although the inputs to the NAND gates ND21 and ND22 originate from the same source, namely the output of the NAND gate ND11, the input i0 to the NAND gate ND21 and the input i1 to the NAND gate ND22 are typically different (from each other) due to different parasitics in the circuit (e.g., different resistance and capacitance from the NAND gate ND11 to respective NAND gates ND21 and ND22).

In addition, based on the input i1 to the NAND gate ND11 (e.g., a falling waveform determined from simulation 5), the input i0 to the NAND gate ND21 and the input i1 to the NAND gate ND22 are determined (called herein "simulation 17"). Again, although the inputs to the NAND gates ND21 and ND22 originate from the same source, namely the output of the NAND gate ND11, the input i0 to the NAND gate ND21 and the input i1 to the NAND gate ND22 are typically different (from each other) due to different parasitics in the circuit (e.g., different resistance and capacitance from the NAND gate ND11 to respective NAND gates ND21 and ND22).

Based on the input i0 to the NAND gate ND12 (e.g., a rising waveform determined from simulation 8), the input i0 to the NAND gate ND22 and the input i1 to the NAND gate ND20 are determined (called herein "simulation 18"). In some embodiments, the input i1 to the NAND gate ND12 is assumed to be in a logic high state. Although the inputs to the NAND gates ND22 and ND20 originate from the same source, namely the output of the NAND gate ND12, the input i0 to the NAND gate ND22 and the input i1 to the NAND gate ND20 are typically different (from each other) due to different parasitics in the circuit (e.g., different resistance and capacitance from the NAND gate ND12 to respective NAND gates ND22 and ND20).

In addition, based on the input i0 to the NAND gate ND12 (e.g., a falling waveform determined from simulation 9), the input i0 to the NAND gate ND22 and the input i1 to the NAND gate ND20 are determined (called herein "simulation 19"). Again, although the inputs to the NAND gates ND22 and ND20 originate from the same source, namely the output of the NAND gate ND12, the input i0 to the NAND gate ND22 and the input i1 to the NAND gate ND20 are typically different (from each other) due to different parasitics in the circuit (e.g., different resistance and capacitance from the NAND gate ND12 to respective NAND gates ND22 and ND20).

Similarly, based on the input i1 to the NAND gate ND12 (e.g., a rising waveform determined from simulation 6), the input i0 to the NAND gate ND22 and the input i1 to the NAND gate ND20 are determined (called herein "simulation 20"). In some embodiments, the input i0 to the NAND gate ND12 is assumed to be in a logic high state. Although the inputs to the NAND gates ND22 and ND20 originate from the same source, namely the output of the NAND gate ND12, the input i0 to the NAND gate ND22 and the input i1 to the NAND gate ND20 are typically different (from each other) due to different parasitics in the circuit (e.g., different resistance and capacitance from the NAND gate ND12 to respective NAND gates ND22 and ND20).

In addition, based on the input i1 to the NAND gate ND12 (e.g., a falling waveform determined from simulation 7), the input i0 to the NAND gate ND22 and the input i1 to the NAND gate ND20 are determined (called herein "simulation 21"). Again, although the inputs to the NAND gates ND22 and ND20 originate from the same source, namely the output of the NAND gate ND12, the input i0 to the NAND gate ND22 and the input i1 to the NAND gate ND20 are typically different (from each other) due to different parasitics in the circuit (e.g., different resistance and capacitance from the NAND gate ND12 to respective NAND gates ND22 and ND20).

Based on the input i0 to the NAND gate ND20 (e.g., a falling waveform determined from simulation 10), the data input to the flip-flop FF30 is determined (called herein "simulation 22"). In some embodiments, the input in1 to the NAND gate ND20 is assumed to be in a logic high state. In addition, based on the input in0 to the NAND gate ND20 (e.g., a rising waveform determined from simulation 11), the data input to the flip-flop FF30 is determined (called herein "simulation 23"). Based on the input i0 to the NAND gate ND20 (e.g., a falling waveform determined from simulation 12), the data input to the flip-flop FF30 is determined (called herein "simulation 24"). In some embodiments, the input in1 to the NAND gate ND20 is assumed to be in a logic high state. In addition, based on the input in0 to the NAND gate ND20 (e.g., a rising waveform determined from simulation 13), the data input to the flip-flop FF30 is determined (called herein "simulation 25").

Based on the input i1 to the NAND gate ND20 (e.g., a falling waveform determined from simulation 18), the data input to the flip-flop FF30 is determined (called herein "simulation 26"). In some embodiments, the input in0 to the NAND gate ND20 is assumed to be in a logic high state. In addition, based on the input in1 to the NAND gate ND20 (e.g., a rising waveform determined from simulation 19), the data input to the flip-flop FF30 is determined (called herein "simulation 27"). Based on the input i1 to the NAND gate ND20 (e.g., a falling waveform determined from simulation 20), the data input to the flip-flop FF30 is determined (called herein "simulation 28"). In some embodiments, the input in0 to the NAND gate ND20 is assumed to be in a logic high state. In addition, based on the input in1 to the NAND gate ND20 (e.g., a rising waveform determined from simulation 21), the data input to the flip-flop FF30 is determined (called herein "simulation 29").

Based on the input i0 to the NAND gate ND21 (e.g., a falling waveform determined from simulation 14), the data input to the flip-flop FF31 is determined (called herein "simulation 30"). In some embodiments, the input in1 to the NAND gate ND21 is assumed to be in a logic high state. In addition, based on the input in0 to the NAND gate ND21 (e.g., a rising waveform determined from simulation 15), the data input to the flip-flop FF31 is determined (called herein "simulation 31"). Based on the input i0 to the NAND gate ND21 (e.g., a falling waveform determined from simulation 16), the data input to the flip-flop FF31 is determined (called herein "simulation 32"). In some embodiments, the input in1 to the NAND gate ND21 is assumed to be in a logic high state. In addition, based on the input in0 to the NAND gate ND21 (e.g., a rising waveform determined from simulation 17), the data input to the flip-flop FF31 is determined (called herein "simulation 33").

Based on the input i1 to the NAND gate ND21 (e.g., a falling waveform determined from simulation 10), the data input to the flip-flop FF31 is determined (called herein "simulation 34"). In some embodiments, the input in0 to the NAND gate ND21 is assumed to be in a logic high state. In addition, based on the input in1 to the NAND gate ND21 (e.g., a rising waveform determined from simulation 11), the data input to the flip-flop FF31 is determined (called herein "simulation 35"). Based on the input i1 to the NAND gate ND21 (e.g., a falling waveform determined from simulation 12), the data input to the flip-flop FF31 is determined (called herein "simulation 36"). In some embodiments, the input in0 to the NAND gate ND21 is assumed to be in a logic high state. In addition, based on the input in1 to the NAND gate ND21 (e.g., a rising waveform determined from simulation 13), the data input to the flip-flop FF31 is determined (called herein "simulation 37").

Based on the input i0 to the NAND gate ND22 (e.g., a falling waveform determined from simulation 18), the data input to the flip-flop FF32 is determined (called herein "simulation 38"). In some embodiments, the input in1 to the NAND gate ND22 is assumed to be in a logic high state. In addition, based on the input in0 to the NAND gate ND22 (e.g., a rising waveform determined from simulation 19), the data input to the flip-flop FF32 is determined (called herein "simulation 39"). Based on the input i0 to the NAND gate ND22 (e.g., a falling waveform determined from simulation 20), the data input to the flip-flop FF32 is determined (called herein "simulation 40"). In some embodiments, the input in1 to the NAND gate ND22 is assumed to be in a logic high state. In addition, based on the input in0 to the NAND gate ND22 (e.g., a rising waveform determined from simulation 21), the data input to the flip-flop FF32 is determined (called herein "simulation 41").

Based on the input i1 to the NAND gate ND22 (e.g., a falling waveform determined from simulation 14), the data input to the flip-flop FF32 is determined (called herein "simulation 42"). In some embodiments, the input in0 to the NAND gate ND22 is assumed to be in a logic high state. In addition, based on the input in1 to the NAND gate ND22 (e.g., a rising waveform determined from simulation 15), the data input to the flip-flop FF32 is determined (called herein "simulation 43"). Based on the input i1 to the NAND gate ND22 (e.g., a falling waveform determined from simulation 16), the data input to the flip-flop FF32 is determined (called herein "simulation 44"). In some embodiments, the input in0 to the NAND gate ND22 is assumed to be in a logic high state. In addition, based on the input in1 to the NAND gate ND22 (e.g., a rising waveform determined from simulation 17), the data input to the flip-flop FF32 is determined (called herein "simulation 45").

Based on this, simulations 2 and 3 depend from simulation 1 (e.g., requires the result of simulation 1). Simulations 4, 5, 6, 7, 8, and 9 depend from simulation 2. Simulations 10 and 16 depend from simulation 4. Simulations 11 and 17 depend from simulation 5. Simulations 14 and 20 depend from simulation 6. Simulations 15 and 21 depend from simulation 7. Simulations 12 and 18 depend from simulation 8. Simulations 13 and 19 depend from simulation 9. Simulations 22 and 34 depend from simulation 10. Simulations 23 and 35 depend from simulation 11. Simulations 24 and 36 depend from simulation 12. Simulations 25 and 37 depend from simulation 13. Simulations 30 and 42 depend from simulation 14. Simulations 31 and 43 depend from simulation 15. Simulations 32 and 44 depend from simulation 16. Simulations 33 and 45 depend from simulation 17. Simulations 26 and 38 depend from simulation 18. Simulations 27 and 39 depend from simulation 19. Simulations 28 and 40 depend from simulation 20. Simulations 29 and 41 depend from simulation 21. In some embodiments, simulations 22 through 45 also depend on simulation 3 (in some cases, that simulations 22 through 45 depend on simulation 3 is not significant because in the sequence of simulations, simulation 3 is typically completed well in advance of simulations 22 through 45).

In some embodiments, the components (e.g., inverters, flip-flops, and gates) illustrated in FIGS. 5A-5G are processed on a single computer. In some other embodiments, the components illustrated in FIGS. 5A-5G are processed using the distributed computer system 100. The components illustrated in FIGS. 5A-5G are assigned to multiple computers (e.g., node systems 124) so that at least some of the components are processed in parallel. In some embodiments, the distributed computer system 100 includes one or more computers (e.g., grid server 102) for coordinating communications with the multiple computers (e.g., node systems 124).

In some embodiments, in response to completion of simulation 1, simulations 2 and 3 are initiated (e.g., by sending information required to perform simulations 2 and 3 to one or more node systems). Similarly, in some embodiments, in response to completion of simulation 2, simulations 4, 5, 6, 7, 8, and 9 are initiated; in response to completion of simulation 4, simulations 10 and 16 are initiated; in response to completion of simulation 5, simulations 11 and 17 are initiated; in response to completion of simulation 6, simulations 14 and 20 are initiated; in response to completion of simulation 7, simulations 15 and 21 are initiated; in response to completion of simulation 8, simulations 12 and 18 are initiated; in response to completion of simulation 9, simulations 13 and 19 are initiated; in response to completion of simulation 10, simulations 22 and 34 are initiated; in response to completion of simulation 11, simulations 23 and 35 are initiated; in response to completion of simulation 12, simulations 24 and 36 are initiated; in response to completion of simulation 13, simulations 25 and 37 are initiated; in response to completion of simulation 14, simulations 30 and 42 are initiated; in response to completion of simulation 15, simulations 31 and 43 are initiated; in response to completion of simulation 16, simulations 32 and 44 are initiated; in response to completion of simulation 17, simulations 33 and 45 are initiated; in response to completion of simulation 18, simulations 26 and 38 are initiated; in response to completion of simulation 19, simulations 27 and 39 are initiated; in response to completion of simulation 20, simulations 28 and 40 are initiated; and in response to completion of simulation 21, simulations 29 and 41 are initiated.

In some embodiments, 45 simulations are randomly assigned to node systems 124, which requires transmitting circuit information (e.g., circuit topology and component parameters) for the 45 simulations need to be transmitted.

This increases the network traffic. When the network bandwidth is limited, it is desirable to reduce the amount of circuit information transmitted over the network.

In some embodiments, the 45 simulations are grouped based on the circuit topology (e.g., simulations that depend on the same circuit topology, or circuit structure are grouped together). For example, simulations 4 and 5 are grouped together; simulations 6 and 7 are grouped together; simulations 8 and 9 are grouped together; simulations 10, 11, 12, and 13 are grouped together; simulations 14, 15, 16, and 17 are grouped together; simulations 18, 19, 20, and 21 are grouped together; simulations 22, 23, 24, 25, 26, 27, 28, and 29 are grouped together; simulations 30, 31, 32, 33, 34, 35, 36, and 37 are grouped together; and simulations 38, 39, 40, 41, 42, 43, 44, and 45 are grouped together. Then, in response to completion of simulation 1, simulation 2 is initiated; also in response to completion of simulation 1, simulation 3 is initiated; in response to completion of simulation 2, simulations 4 and 5 are initiated; also in response to completion of simulation 2, simulations 6 and 7 are initiated; in response to completion of simulation 2, simulations of 8 and 9 are initiated; in response to completion of simulations 4, 5, 8, and 9, simulations 10, 11, 12, and 13 are initiated; in response to completion of simulations 4, 5, 6, and 7, simulations 14, 15, 16, and 17 are initiated; in response to completion of simulations 6, 7, 8, and 9, simulations 18, 19, 20, and 21 are initiated; in response to completion of simulations 10, 11, 12, 13, 18, 19, 20, and 21, simulations 22, 23, 24, 25, 26, 27, 28, and 29 are initiated; in response to completion of simulations 10, 11, 12, 13, 14, 15, 16, and 17, simulations 30, 31, 32, 33, 34, 35, 36, and 37 are initiated; and in response to completion of simulations 14, 15, 16, 17, 18, 19, 20, and 21, simulations 38, 39, 40, 41, 42, 43, 44, and 45 are initiated. In this approach, information for the circuit topology needs to be transmitted 12 times. This is a significant reduction from the transmission of the circuit topology 45 times, thereby reducing the network traffic, which can improve the speed of the overall process when there is a limited network bandwidth. In particular, when the on-chip variation needs to be considered, the number of simulations increases even further. However, in this approach, the number of transmissions of the circuit topology does not increase with the on-chip variation (because the on-chip variation does not change the circuit topology), and thus, the analysis of the on-chip variation can especially benefit from this approach.

FIG. 5H illustrates another exemplary digital circuit in accordance with some embodiments. The circuit shown in FIG. 5H includes a NAND gate ND0, an inverter inv2, and an AND gate AN0. FIG. 5H also illustrates that the output of the NAND gate ND0 has twelve waveforms (e.g., seven rising waveforms and five falling waveforms). In one approach, simulations based on the twelve waveforms are assigned to various node systems 124 and the topological information about the connection between the NAND gate ND0 and the AND gate AN0 needs to be sent twelve times. In another approach, the computer waits until all twelve waveforms are determined for the NAND gate ND0 and sends a single request for simulating the input to the AND gate AN0 based on the twelve waveforms. Again, this approach reduces the network traffic. When the network traffic is a bottleneck in the overall simulation process, this approach can significantly improve the speed of the overall simulation process.

FIG. 6 is a sequence diagram illustrating operations performed by the distributed computing system 100 (FIG. 1) including the grid server 102, the node system 124, and the client system 122 in accordance with some embodiments.

In some embodiments, the client system 122 receives a user input (e.g., a keyboard input or a mouse click) that corresponds to a request for a simulation result (e.g., a request to perform a simulation and provide a result). The client system 122 sends (602) a request for a simulation result. In some embodiments, the client system 122 and/or the grid server 102 analyzes a digital circuit and identifies one or more components that are ready for simulation at a particular stage of the simulation. Alternatively, the client system 122 receives from another computer system or one or more programs an instruction to request the simulation result.

The grid server 102 receives (604) the request. In some embodiments, the request includes a digital circuit, and the grid server 102 processes the digital circuit (e.g., identifying computation tasks that can be performed in parallel). In some embodiments, the request includes only a portion of the digital circuit (the computation tasks that can be performed in parallel, or one or more components that can be processed in parallel, have been identified by the client system 122). The grid server 102 is coupled with multiple node systems 124, and the grid server 102 allocates (606) the computation tasks to the multiple node systems 124. In some embodiments, allocating the computation tasks includes determining which node systems 124 should receive one or more of the computation tasks. In some embodiments, a determination of which node systems should receive one or more of the computation tasks is made based on which node systems are idle, which node systems have low computing load, and/or conditions of network connections to the node systems. In some embodiments, the grid server 102 allocates no more than one task to a single node system 124. In some embodiments, allocating the computation tasks includes sending the computation tasks to respective node systems 124. For example, a first node system 124-1 in FIG. 1 receives a first task (e.g., determine timing delay for a first component) and a second node system 124-M in FIG. 1 receives a second task (e.g., determine a timing delay for a second component).

In some embodiments, the grid server 102 is configured simply to distribute requests from the client system 122 to the node systems 124 and return results from the node systems 124 to the client system 122. Once the client system 122 receives simulation results from the grid server 102, the client system 122 sends subsequent requests to the grid server 102.

A node system 124 receives (608) an allocated task and processes (610) the received task (e.g., performs the allocated computation task). In some embodiments, the node system 124 processes the received task using (612) one or more virtual machines.

In some embodiments, the node system 124 further divides the allocated task into multiple sub-tasks. In some embodiments, the node system processes the multiple sub-tasks using respective virtual machines (e.g., processing a first sub-task using a first virtual machine, processing a second sub-task using a second virtual machine, etc.).

The node system 124 sends (614) a result of processing the received task (e.g., timing delays, noise injection, and power consumption, etc.).

The grid server 102 receives and compiles (616) the result from each grid node system 124. For example, the grid server 102 receives a first result from the first grid node system 124-1 and a second result from the second grid node system 124-M.

In some embodiments, the grid server 102 allocates (606) a next set of computation tasks and receives results for the next set of computation tasks. In some embodiments, the grid server 102 repeats allocating computation tasks and receiving and compiling results until all computation tasks have been processed.

The grid server 102 sends (618) the compiled result to the client system 122.

The client system 122 receives (620) the compiled result. In some embodiments, the client system stores and/or displays (622) the compiled result (e.g., on the user interface 405, FIG. 4).

Thus, FIG. 6 illustrates simulating a digital circuit using the distributed computing system 100 (FIG. 1).

FIGS. 7A-7E are flowcharts illustrating a method 700 of performing a breadth-first-search for an analysis of a digital circuit in accordance with some embodiments. In some embodiments, the method 700 is performed at a computer system with one or more processors and memory.

The method includes performing a breadth-first-search for an analysis of a digital circuit that includes a plurality of components. In some embodiments, the breadth-first-search includes identifying a sequence of processing the plurality of components. In some embodiments, the breadth-first-search includes identifying one or more components of the plurality of components that are eligible for processing in parallel. Because the breadth-first-search allows identifying two or more components that can be processed in parallel, the two or more components identified using the breadth-first-search are easier to process using a distributed computing system, which allows a faster and more efficient processing of the components. In comparison, traditional methods, such as depth-first-search, are difficult to implement on a distributed computing system.

The method includes (702) identifying two or more N generation components of the plurality of components of the digital circuit. In some embodiments, first generation components are components with input pins coupled with input pins of the digital circuit. For example, the computer system identifies the inverter inv0, shown in FIG. 5A, as a first generation component, and the inverters inv1 and inv2, shown in FIG. 5B, as N generation components (when N=2).

The method includes (704) initiating processing of the two or more N generation components. For example, the computer system initiates processing the inverters inv1 and inv2 as shown in FIG. 5B. In some embodiments, the computer system (e.g., a client system 122) sends a request to the grid server 102 for processing the inverters inv1 and inv2.

The method includes (706), subsequent to initiating the processing of the two or more N generation components, receiving results of processing a subset, less than all, of the two or more N generation components. For example, the computer system receives results of processing the inverter inv1 before receiving results of processing the inverter inv2.

The method includes, prior to receiving results of processing all components of the N generation components, identifying (708) one or more N+1 generation components of the plurality of components of the digital circuit, and initiating (710) processing of the one or more identified N+1 generation components. For examples, the computer system identifies the flip-flops FF00, FF01, and FF02, shown in FIG. 5C, as N+1 generation components and sends a request to the grid server 102 for processing the flip-flops FF00, FF01, and FF02.

In some embodiments, identifying the one or more N+1 generation components of the plurality of components of the digital circuit includes (736, FIG. 7D) identifying the one or more N+1 generation components of the plurality of components of the digital circuit based at least in part on the results of processing the subset of the two or more N generation components. For example, the computer system identifies the flip-flops FF00, FF01, and FF02 as N+1 generation components based on the results of processing the inverter inv1.

Referring back to FIG. 7A, the method includes, subsequent to initiating processing of the one or more identified N+1 generation components, receiving (712) results of processing at least a subset of the one or more identified N+1 generation components. For example, after the computer system sends the request to the grid server 102 for processing the flip-flops FF00, FF01, and FF02, the computer system receives results of processing the inverter inv2.

In some embodiments, the method includes, subsequent to initiating processing of the one or more identified N+1 generation components, receiving (738, FIG. 7E) results of processing the two or more N generation components other than the subset, less than all, of the two or more N generation components. The method also includes identifying additional components of the plurality of components of the digital circuit as additional N+1 generation components (e.g., based on the results of processing the two or more N generation components other than the subset, less than all, of the two or more N generation components); initiating processing of the additional N+1 generation components; and, subsequent to initiating of processing the additional N+1 generation components, receiving results of processing at least a subset of the additional N+1 generation components. For example, the computer system identifies the flip-flops FF30, FF31, and FF32 (FIG. 5F) as additional N+1 generation components.

In some embodiments, processing of the additional N+1 generation components is initiated (740) subsequent to receiving results of processing all of the two or more N generation components. For example, in some embodiments, processing of the flip-flops FF30, FF31, and FF32 is initiated after receiving results of processing the inverter inv2 (and receiving results of processing the inverter inv1).

In some embodiments, identifying the additional components of the plurality of components of the digital circuit as the additional N+1 generation components includes (742) identifying the additional components of the plurality of components of the digital circuit as the additional N+1 generation components based at least in part on the results of processing the two or more N generation components other than the subset, less than all, of the two or more N generation components. For example, the flip-flops FF30, FF31, and FF32 (FIG. 5F) are identified as N+1 generation components based on the results of processing the inverter inv2.

In some embodiments, the results of processing at least the subset of the one or more identified N+1 generation components are received (744) prior to receiving results of processing all of the two or more N generation components. For example, the results of processing the flip-flops FF00, FF01, and FF02 (FIG. 5C) are received prior to receiving results of processing the inverters inv1 and inv2.

In some embodiments, the one or more identified N+1 generation components include (746) two or more N+1 generation components. For example, the flip-flops FF00, FF01, and FF02 are identified as N+1 generation components.

Referring back to FIG. 7A, in some embodiments, the method includes (714) repeating the identifying one or more N+1 generation components of the plurality of components of the digital circuit, initiating processing of the one or more identified N+1 generation components, and receiving results of processing at least a subset of the one or more identified N+1 generation components. Each time the identifying, initiating, and receiving are repeated, N is advanced by a generation. For example, the computer system repeats the processing of the NAND gates ND10, ND11, and ND12, and the NAND gates ND20, ND21, and ND22 (concurrently with, or subsequent to, initiating processing of the NAND gates ND10, ND11, and ND12).

In some embodiments, processing a respective component of the plurality of components of the digital circuit includes (716, FIG. 7B) calculating a timing delay associated with a switching activity of an input of the respective component of the plurality of component. In some embodiments, processing the respective component of the plurality of components of the digital circuit includes calculating the timing delay associated with a switching activity of the input of the respective component of the plurality of component, through an output of the respective component to an input of a next generation component. For example, in FIG. 5B, processing the inverter inv1 includes calculating a timing delay associated with the inverter inv1 (in switching from a high state to a low state or from a low state to a high state). In some embodiments, calculating a timing delay for the respective component is repeated for a number of variations (e.g., a number of semiconductor process corners and/or "on chip" variations") of the respective component. For example, calculating a timing delay for the respective component is performed 20 times for a particular component, when there are five different process corners and four "on chip" variations.

In some embodiments, processing a respective component of the plurality of components of the digital circuit includes (718) determining a noise injection associated with a switching activity of an input of the respective component of the plurality of components. In some embodiments, processing the respective component of the plurality of components of the digital circuit includes determining the noise injection associated with a switching activity of the input of the respective component of the plurality of components, through electro-magnetic coupling to an input of another component of the digital circuit. In some embodiments, processing the respective component includes determining changes to the timing delay associated with the respective component due to a noise injected to the respective component. For example, in FIG. 5B, processing the inverter inv2 includes determining a noise injection associated with switching the inverter inv2 from a high state to a low state or from a low state to a high state. In some embodiments, processing a respective component of the plurality of components of the digital circuit includes (718) determining a noise injection associated with a switching activity of a coupled component of the plurality of components. For example, in FIG. 5B, processing the inverter inv2 includes determining a noise injection associated with switching the output of the NAND gate ND12. In some embodiments, determining a noise injection for the respective component is repeated for a number of variations (e.g., a number of semiconductor process corners and/or "on chip" variations") of the respective component. For example, determining a noise injection for the respective component is performed 20 times for a particular component, when there are five different process corners and four "on chip" variations.

In some embodiments, processing a respective component of the plurality of components of the digital circuit includes (720) calculating power consumption associated with a switching activity of an input of the respective component of the plurality of components. In some embodiments, calculating power consumption for the respective component is repeated for a number of variations (e.g., a number of semiconductor process corners and/or "on chip" variations") of the respective component. For example, calculating power consumption for the respective component is performed 20 times for a particular component, when there are five different process corners and four "on chip" variations.

In some embodiments, initiating processing of the two or more N generation components includes (722) initiating processing of a predetermined number of on-chip variations for each of the two or more N generation components. For example, the computer system initiates determining a timing delay associated with a respective component for the predetermined number of on-chip variations. The predetermined number of on-chip variations corresponds to variations of physical sizes and performance characteristics of the respective component.

In some embodiments, initiating processing of the two or more N generation components includes (724, FIG. 7C) sending to a second computer system that is distinct from the computer system instructions for processing the two or more N generation components. For example, the computer system is a client system 122 and the second computer system is a grid server 102 (FIG. 1).

In some embodiments, the second computer system is located (726) remotely from the computer system. For example, the computer system and the second computer system are located in different buildings, cities, and/or geographic areas.

In some embodiments, the second computer system is configured (728) to send instructions to a plurality of distributed computers. A number of the plurality of distributed computers is determined based at least in part on a number of components in the N generation components and a predetermined number of on-chip variations and/or a number of process corners. For example, the grid server 102 sends instructions to multiple node systems 124. The computer system and/or the second computer (e.g., the client system 122 and/or the grid server 102) determine how many distributed computers to use for processing the two or more N generation components. Because communicating with a distributed computer involves a delay, sending instructions to too many distributed computers takes more time than necessary. In addition, a distributed computer that is busy performing other tasks may not respond well to an instruction from the second computer. Thus, the computer system and/or the second computer determine how many distributed computers to use for processing the two or more N generation components based on communication capacity with the distributed computers and work loads of the distributed computers. As used herein, on-chip variations refer to variations among components (e.g., transistors) on a same die. As used herein, process corners refer to extremes of processing parameters (e.g., process temperature ranges, etching times, deposition thickness, etc.). To account for the on-chip variations and the process corners, additional calculations are needed and, thus, additional distributed computers are needed for calculation in parallel.

In some embodiments, the second computer system is configured (730) to send to a respective distributed computer of the plurality of distributed computers instructions to process a respective N generation component of the two or more N generation components for a respective on-chip variation and/or a number of process corners. For example, the grid server 102 sends to a respective node system 124-M instructions to process the flip-flop FF02 for an on-chip variation (e.g., a particular set of a length, a width, and a thickness of a transistor, an associated resistance, and an associated capacitance).

In some embodiments, initiating processing of the two or more N generation components includes (732) initiating processing of each of the two or more N generation components for multiple state transitions (e.g., from a high state to a low state and from a low state to a high state).

In some embodiments, the second computer system is configured (734) to send instructions to a plurality of distributed computers. A number of the plurality of distributed computers is determined at least based on a number of components in the two or more N generation components and a number of states in the multiple state transitions. For example, when the number of identified N generation components is X (e.g., 2) and the number of state transitions is 2, the second computer system sends instructions to 2X (e.g., 4) distributed computers (assuming that the plurality of distributed computers includes at least 2X distributed computers). In some embodiments, each distributed computer processes a respective N generation component for a respective state transition.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the underlying principles and their practical applications, to thereby enable others skilled in the art to best utilize the described principles and various embodiments with various modifications as are suited to the particular use contemplated.

For example, in some embodiments, a method performed at a computer system with one or more processors and memory includes performing an analysis of a digital circuit that includes a plurality of components. The method includes identifying a number of paths for the plurality of components of the digital circuit; and initiating processing of the paths. In some embodiments, all of the identified paths are processed in parallel (e.g., by distributed computers). In some embodiments, only a subset of the identified paths are processed in parallel, and the method includes, subsequent to receiving results of at least one path of the subset, initiating processing of at least one remaining path of the identified paths.

What is claimed is:

1. A method, comprising:
at a computer system with one or more processors and memory:
performing a breadth-first-search for an analysis of a digital circuit that includes a plurality of components, including:
identifying two or more N generation components of the plurality of components of the digital circuit;
initiating processing of the two or more N generation components;
subsequent to initiating the processing of the two or more N generation components, receiving results of processing a subset, less than all, of the two or more N generation components;
prior to receiving results of processing all components of the N generation components:
identifying one or more N+1 generation components of the plurality of components of the digital circuit; and
initiating processing of the one or more identified N+1 generation components; and,
subsequent to initiating processing of the one or more identified N+1generation components, receiving results of processing at least a subset of the one or more identified N+1 generation components;
wherein processing a respective component of the plurality of components of the digital circuit includes one or more of:
calculating a timing delay associated with a switching activity of an input of the respective component of the plurality of components,
determining a noise injection associated with a switching activity of an input of the respective component of the plurality of components, and
calculating power consumption associated with a switching activity of an input of the respective component of the plurality of components.

2. The method of claim 1, including:
subsequent to initiating processing of the one or more identified N+1 generation components, receiving results of processing the two or more N generation components other than the subset, less than all, of the two or more N generation components;
identifying additional components of the plurality of components of the digital circuit as additional N+1 generation components;
initiating processing of the additional N+1 generation components; and,
subsequent to initiating of processing the additional N+1 generation components, receiving results of processing at least a subset of the additional N+1 generation components.

3. The method of claim 2, wherein processing of the additional N+1 generation components is initiated subsequent to receiving results of processing all of the two or more N generation components.

4. The method of claim 2, wherein identifying the additional components of the plurality of components of the digital circuit as the additional N+1 generation components includes identifying the additional components of the plurality of components of the digital circuit as the additional N+1 generation components based at least in part on the results of processing the two or more N generation components other than the subset, less than all, of the two or more N generation components.

5. The method of claim 1, wherein the results of processing at least the subset of the one or more identified N+1 generation components are received prior to receiving results of processing all of the two or more N generation components.

6. The method of claim 1, wherein the one or more identified N+1 generation components include two or more N+1 generation components.

7. The method of claim 1, including repeating the identifying one or more N+1 generation components of the plurality of components of the digital circuit, initiating processing of the one or more identified N+1 generation components, and receiving results of processing at least a subset of the one or more identified N+1 generation components, wherein each time the identifying, initiating, and receiving are repeated, N is advanced by a generation.

8. The method of claim 1, wherein initiating processing of the two or more N generation components includes initiating processing of a predetermined number of on-chip variations for each of the two or more N generation components.

9. The method of claim 1, wherein identifying the one or more N+1 generation components of the plurality of components of the digital circuit includes identifying the one or more N+1 generation components of the plurality of components of the digital circuit based at least in part on the results of processing the subset of the two or more N generation components.

10. The method of claim 1, wherein initiating processing of the two or more N generation components includes sending to a second computer system that is distinct from the computer system instructions for processing the two or more N generation components.

11. The method of claim 10, wherein the second computer system is located remotely from the computer system.

12. The method of claim 10, wherein the second computer system is configured to send instructions to a plurality of distributed computers, wherein a number of the plurality of distributed computers is determined based at least in part on a number of components in the N generation components and a predetermined number of on-chip variations and/or a number of process corners.

13. The method of claim 12, wherein the second computer system is configured to send to a respective distributed computer of the plurality of distributed computers instructions to process a respective N generation component of the two or more N generation components for a respective on-chip variation and/or a number of process corners.

14. The method of claim 10, wherein initiating processing of the two or more N generation components includes initiating processing of each of the two or more N generation components for multiple state transitions.

15. The method of claim 14, wherein the second computer system is configured to send instructions to a plurality of distributed computers, wherein a number of the plurality of distributed computers is determined at least based on a number of components in the two or more N generation components and a number of states in the multiple state transitions.

16. A computer system, comprising:
one or more processors; and
memory storing one or more programs, the one or more programs including instructions for:
performing a breadth-first-search for an analysis of a digital circuit that includes a plurality of components, including:
identifying two or more N generation components of the plurality of components of the digital circuit;
initiating processing of the two or more N generation components;
subsequent to initiating processing of the two or more N generation components, receiving results of processing a subset, less than all, of the two or more N generation components;
prior to receiving results of processing all components of the N generation components:
identifying one or more N+1 generation components of the plurality of components of the digital circuit; and
initiating processing of the one or more identified N+1 generation components; and,
subsequent to sending to the second computer system the instructions for processing the one or more identified N+1 generation components, receiving results of processing at least a subset of the one or more identified N+1 generation components;
wherein processing a respective component of the plurality of components of the digital circuit includes one or more of:
calculating a timing delay associated with a switching activity of an input of the respective component of the plurality of components,
determining a noise injection associated with a switching activity of an input of the respective component of the plurality of components, and
calculating power consumption associated with a switching activity of an input of the respective component of the plurality of components.

17. A non-transitory computer readable storage medium, storing:
one or more programs for execution by one or more processors of a computer system, the one or more programs including instructions for:
performing a breadth-first-search for an analysis of a digital circuit that includes a plurality of components, including:
identifying two or more N generation components of the plurality of components of the digital circuit;
initiating processing of the two or more N generation components;
subsequent to initiating processing of the two or more N generation components, receiving results of processing a subset, less than all, of the two or more N generation components;
prior to receiving results of processing all components of the N generation components:
identifying one or more N+1 generation components of the plurality of components of the digital circuit; and
initiating processing of the one or more identified N+1 generation components; and,
subsequent to sending to the second computer system the instructions for processing the one or more identified N+1 generation components, receiving results of processing at least a subset of the one or more identified N+1 generation components;
wherein processing a respective component of the plurality of components of the digital circuit includes one or more of:
calculating a timing delay associated with a switching activity of an input of the respective component of the plurality of components,
determining a noise injection associated with a switching activity of an input of the respective component of the plurality of components, and
calculating power consumption associated with a switching activity of an input of the respective component of the plurality of components.

* * * * *